US011148314B2

(12) United States Patent
Markiewicz et al.

(10) Patent No.: US 11,148,314 B2
(45) Date of Patent: Oct. 19, 2021

(54) MANUAL FOOD PROCESSOR WITH REMOVABLE CARTRIDGES

(71) Applicant: The Vollrath Company, L.L.C., Sheboygan, WI (US)

(72) Inventors: Jacob Allen Markiewicz, Cleveland, WI (US); Jill Eileen Hundley, Sheboygan, WI (US); Matthew P. Schemelin, West Bend, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 0 days.

(21) Appl. No.: 16/719,445

(22) Filed: Dec. 18, 2019

(65) Prior Publication Data

US 2021/0187774 A1 Jun. 24, 2021

(51) Int. Cl.
*B26D 7/26* (2006.01)
*A47J 43/00* (2006.01)
(Continued)

(52) U.S. Cl.
CPC ............ *B26D 7/2614* (2013.01); *A47J 43/00* (2013.01); *B26D 5/10* (2013.01); *B26D 7/088* (2013.01);
(Continued)

(58) Field of Classification Search
CPC . B26D 3/18; B26D 3/185; B26D 3/26; B26D 2210/02; B26D 1/553;
(Continued)

(56) References Cited

U.S. PATENT DOCUMENTS 940,063 A 11/1909 Reenstierna
1,867,657 A 7/1932 Dellinger
(Continued)

FOREIGN PATENT DOCUMENTS

CH 386633 * 1/1965 ............. B26D 3/185
CN 205075100 * 3/2016

OTHER PUBLICATIONS

Zimmerman Jones, Andrew; How Does a Lever Work and What Can It Do?, Jul. 2019, obtained from https://www.thoughtco.com/how-a-lever-works-2699400 on Aug. 13, 2021 (Year: 2019).*
(Continued)

*Primary Examiner* — Evan H MacFarlane
(74) *Attorney, Agent, or Firm* — Foley & Lardner LLP

(57) ABSTRACT

The manual food processor includes a first shelf configured to receive a blade cartridge. The first shelf includes a first slider configured to selectively retain the blade cartridge at the first shelf. The manual food processor also includes a pair of guide rails extending from the first shelf and a second shelf slidable along the pair of guide rails. The second shelf is configured to receive a pusher block cartridge and includes a second slider configured to selectively retain the pusher block cartridge at the second shelf. The manual food processor also includes a handle mechanism operable to cause the second shelf to slide along the guide rails between an open position and a closed position. The first shelf is spaced apart from the second shelf in the open position, and the pusher block cartridge interfaces with the blade cartridge in the closed position.

9 Claims, 17 Drawing Sheets

(51) Int. Cl.

| | |
|---|---|
| ***B26D 7/08*** | (2006.01) |
| ***B26D 5/10*** | (2006.01) |
| ***B26D 3/26*** | (2006.01) |
| ***B26D 7/00*** | (2006.01) |
| ***B26D 3/18*** | (2006.01) |

(52) U.S. Cl.
CPC ................ *B26D 3/185* (2013.01); *B26D 3/26* (2013.01); *B26D 2007/0018* (2013.01); *B26D 2210/02* (2013.01)

(58) Field of Classification Search
CPC .......... B26D 7/0608; B26D 1/30; B26D 7/26; B26D 7/2614; B26D 7/08; B26D 7/088; B26D 7/18; B26D 7/1818; B26D 2007/1809; B26D 5/10; Y10S 83/932
USPC ........................................................... 83/932
See application file for complete search history.

(56) References Cited

U.S. PATENT DOCUMENTS

| | | | | | |
|---|---|---|---|---|---|
| 1,947,153 | A | | 2/1934 | Dellinger | |
| 2,102,819 | A | | 12/1937 | Ronci | |
| 2,120,375 | A | | 6/1938 | Shaver et al. | |
| 2,283,030 | A | | 5/1942 | Bakewell | |
| 2,346,282 | A | | 4/1944 | Watts | |
| 2,407,924 | A | | 9/1946 | Garfunkel | |
| 2,437,818 | A | * | 3/1948 | Hetzler | B26D 3/185 83/435.19 |
| 2,563,237 | A | * | 8/1951 | Grocoff | B26D 3/185 83/651.1 |
| 3,112,781 | A | | 12/1963 | Popeil | |
| 3,115,172 | A | | 12/1963 | Meurer von Inffeld | |
| 3,369,582 | A | | 2/1968 | Giangiulio | |
| 3,605,839 | A | | 9/1971 | Gerson | |
| 3,631,753 | A | * | 1/1972 | Hall | B21D 28/04 83/399 |
| 3,924,501 | A | * | 12/1975 | Cohen | B26D 5/10 83/404.3 |
| 3,948,132 | A | | 4/1976 | Camp | |
| 4,059,037 | A | | 11/1977 | Gerson et al. | |
| 4,062,260 | A | | 12/1977 | Steinhogl | |
| 4,145,941 | A | | 3/1979 | Davis | |
| 4,184,397 | A | | 1/1980 | Jones | |
| 4,346,634 | A | | 8/1982 | Jones | |
| 4,436,011 | A | | 3/1984 | Jones | |
| 4,573,384 | A | | 3/1986 | Jones | |
| 4,579,028 | A | | 4/1986 | Neidhardt | |
| 4,625,607 | A | | 12/1986 | Maillez | |
| 4,734,027 | A | | 3/1988 | Adams | |
| D298,790 | S | * | 12/1988 | Hutchinson | D7/673 |
| 5,142,973 | A | * | 9/1992 | Tur | B26D 3/26 83/588 |
| 5,245,902 | A | * | 9/1993 | Pereira | B26D 3/185 83/425.3 |
| 5,373,781 | A | | 12/1994 | Knasel | |
| 5,463,943 | A | | 11/1995 | Knasel | |
| 5,520,105 | A | | 5/1996 | Healy | |
| 6,143,391 | A | | 11/2000 | Barnes et al. | |
| 6,435,080 | B1 | | 8/2002 | Zarlengo | |
| 6,564,705 | B2 | | 5/2003 | Zarlengo | |
| 7,191,691 | B2 | | 3/2007 | Kaposi | |
| 7,568,414 | B2 | | 8/2009 | Farid et al. | |
| 7,900,544 | B2 | | 3/2011 | Williams | |
| 7,992,476 | B2 | | 8/2011 | Kaposi | |
| 8,495,941 | B2 | | 7/2013 | Farid et al. | |
| 8,555,763 | B2 | * | 10/2013 | Farid | B26D 3/185 83/620 |
| 8,596,176 | B1 | | 12/2013 | Wagner | |
| 8,739,669 | B2 | | 6/2014 | Engdahl et al. | |
| 8,931,130 | B2 | * | 1/2015 | Dumas | B26D 7/088 15/104.03 |
| 9,226,608 | B2 | | 1/2016 | Cotter et al. | |
| 9,511,504 | B2 | * | 12/2016 | Whitney | B26D 1/03 |
| 9,694,506 | B2 | | 7/2017 | Whitney | |
| 9,840,018 | B2 | | 12/2017 | Whitney | |
| 9,908,252 | B2 | * | 3/2018 | Lopez | B26D 7/1818 |
| 9,914,229 | B2 | | 3/2018 | Fastabend et al. | |
| 10,518,430 | B2 | * | 12/2019 | Wong | A23N 7/026 |
| 10,525,609 | B2 | * | 1/2020 | Arnold | B26D 3/11 |
| 10,532,480 | B2 | * | 1/2020 | Fastabend | B26D 7/225 |
| 2006/0185488 | A1 | | 8/2006 | Short et al. | |
| 2007/0044619 | A1 | * | 3/2007 | Farid | B26D 7/0608 83/620 |
| 2008/0160128 | A1 | * | 7/2008 | Cohen | B26D 3/185 425/296 |
| 2009/0272281 | A1 | | 11/2009 | Hood et al. | |
| 2011/0132161 | A1 | | 6/2011 | Robbins | |
| 2012/0325066 | A1 | | 12/2012 | Braun | |
| 2014/0208908 | A1 | | 7/2014 | Whitney | |
| 2014/0208909 | A1 | | 7/2014 | Whitney | |
| 2014/0208910 | A1 | | 7/2014 | Whitney | |
| 2014/0208911 | A1 | | 7/2014 | Whitney | |
| 2014/0208917 | A1 | | 7/2014 | Whitney | |
| 2015/0224658 | A1 | | 8/2015 | Whitney | |
| 2015/0224659 | A1 | | 8/2015 | Whitney | |
| 2015/0224661 | A1 | | 8/2015 | Whitney | |
| 2015/0224662 | A1 | | 8/2015 | Whitney | |
| 2015/0224663 | A1 | | 8/2015 | Whitney | |
| 2015/0231791 | A1 | | 8/2015 | Robbins | |
| 2015/0296842 | A1 | * | 10/2015 | Romano | A23P 30/10 426/637 |
| 2017/0136644 | A1 | * | 5/2017 | Bagley | B26D 3/11 |
| 2017/0190066 | A1 | | 7/2017 | Fastabend et al. | |
| 2018/0154534 | A1 | | 6/2018 | Fastabend et al. | |
| 2018/0169880 | A1 | | 6/2018 | Whitney | |

OTHER PUBLICATIONS

U.S. Appl. No. 62/869,336, filed Jul. 1, 2019, The Vollrath Company, L.L.C.

Princecastle Marmon Food Service Technologies, Universal Slicer Saber King, Apr. 2017, 7 Pages.

* cited by examiner

MANUAL FOOD PROCESSOR WITH REMOVABLE CARTRIDGES

BACKGROUND

The present disclosure relates generally to the field of food processors, for example manual food cutters for cutting (slicing, dicing, wedging, etc.) foodstuffs. For example, a manual food cutter may be used to slice produce such as tomatoes, onions, apples, peppers, etc. and/or other foodstuffs (e.g., meats, breads, etc.).

One goal for a manual food processor is ease of use. For example, it may be desirable for a manual food processor to be operated by a user in an efficient and intuitive manner to easily cut foodstuffs, with the manual food processor designed such that the foodstuffs can be easily positioned at the manual food processor, cut, and collected after cutting. Another goal for a manual food processor is easy cleaning of the manual food processor, including components thereof that may be in repeated contact with foodstuffs. Another goal may be for easy customization and alteration to allow for different cutting patterns, cut sizes, etc.

SUMMARY

One embodiment of the present disclosure is a manual food processor. The manual food processor includes a first shelf configured to receive a blade cartridge. The first shelf is coupled to a first slider configured to selectively retain the blade cartridge at the first shelf. The first slider is slidable relative to the first shelf in a direction substantially orthogonal to the guide rails. The manual food processor also includes a pair of guide rails extending from the first shelf and a second shelf slidable along the pair of guide rails. The second shelf is configured to receive a pusher block and includes a second slider configured to selectively retain the pusher block at the second shelf. The manual food processor also includes a handle mechanism operable to cause the second shelf to slide along the guide rails between an open position and a closed position. The first shelf is spaced apart from the second shelf in the open position, and the pusher block interfaces with the blade cartridge in the closed position.

Another implementation of the present disclosure is a manual food processor that includes a first shelf configured to receive a blade cartridge, a pair of guide rails extending from the first shelf, a second shelf slidable along the pair of guide rails and configured to removeably receive a pusher block, and a handle mechanism operable to cause the second shelf to slide along the guide rails between an open position and a closed position. The first shelf is spaced apart from the second shelf in the open position and wherein the pusher block interfaces with the blade cartridge in the closed position. The manual food processor also includes a cleaning tool for the manual food processor. The cleaning tool is removeably retained in the pusher block cartridge.

Another implementation of the present disclosure is a manual food processor. The manual food processor includes a first shelf configured to receive a blade cartridge, a pair of guide rails extending from the first shelf, a second shelf slidable along the pair of guide rails and configured to receive a pusher block, and a handle mechanism operable to cause the second shelf to slide along the guide rails between an open position and a closed position. The first shelf is spaced apart from the second shelf in the open position and wherein the pusher block interfaces with the blade cartridge in the closed position. The handle mechanism includes a first pivot point positioned at the second shelf, a second pivot point positioned at a top end of the guide rails, a first member extending from the first pivot point, and a second member extending from the second pivot point. The first member and the second member connect at a third pivot point.

DETAILED DESCRIPTION

Figure 1:
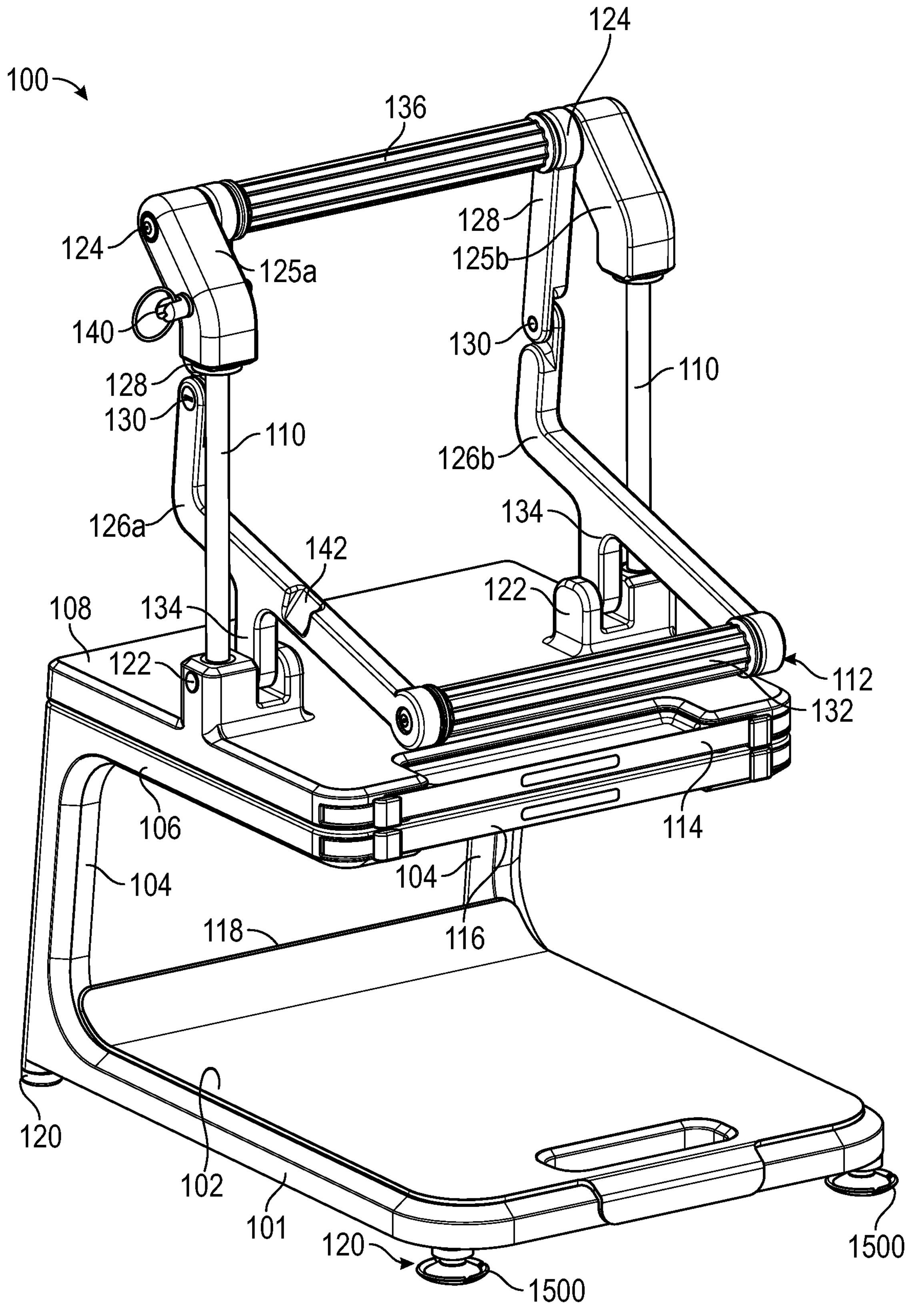
FIG. 1 is a perspective view of a manual food processor, according to some embodiments.
Figure 2:
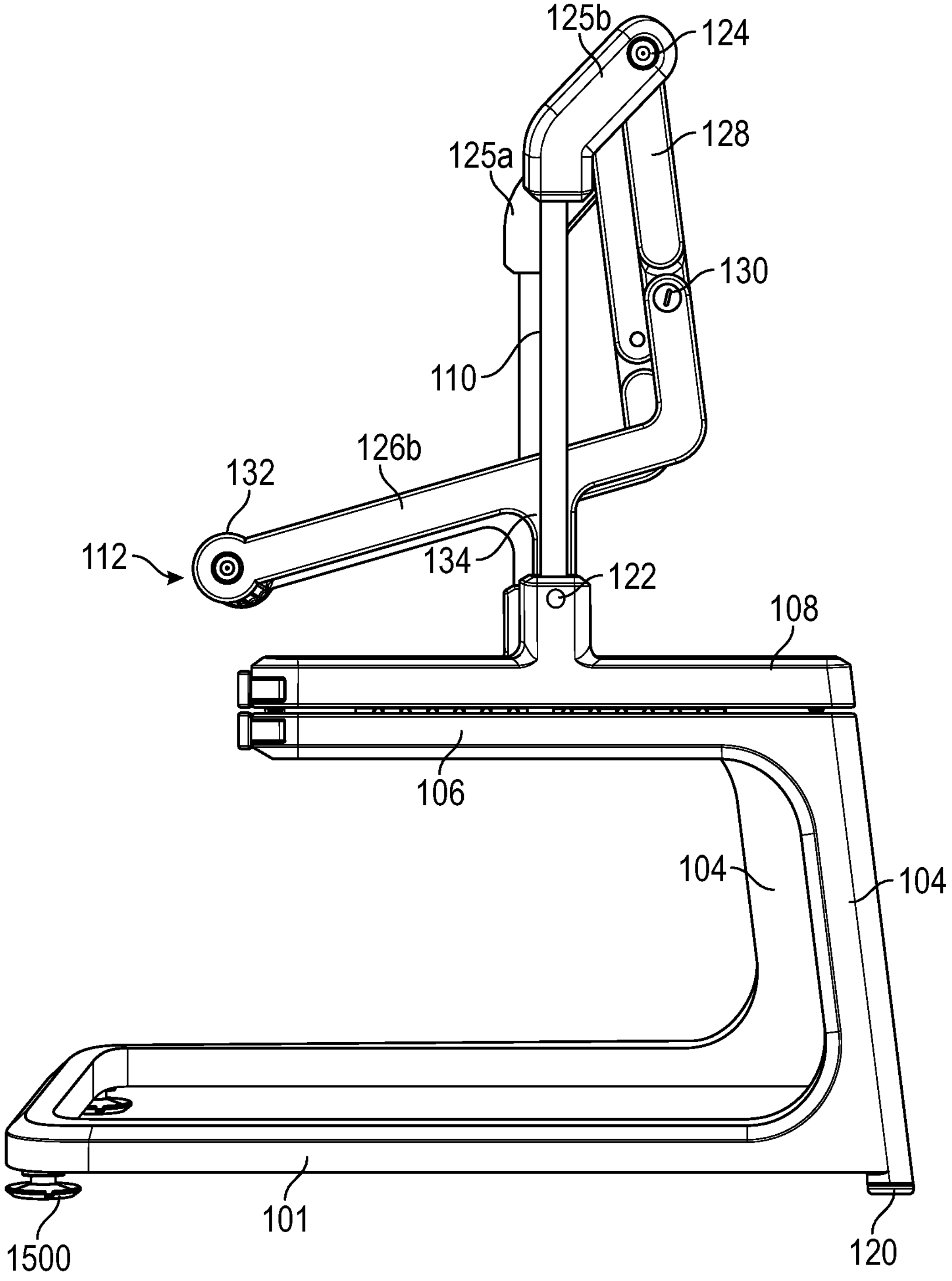
FIG. 2 is a side view of the manual food processor of FIG. 1, according to some embodiments.
Figure 3:
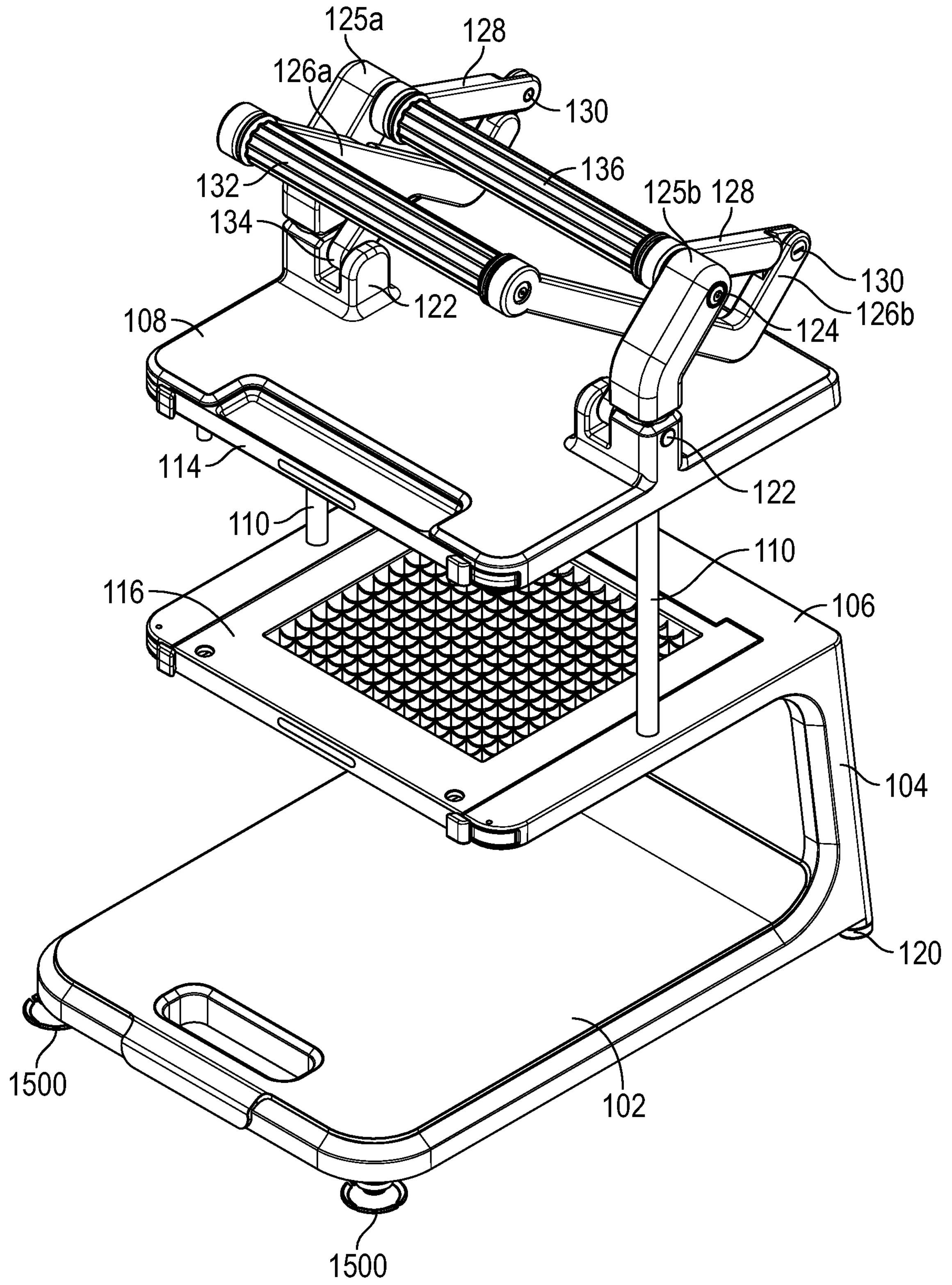
FIG. 3 is another view of the manual food processor of FIGS. 1-2, according to some embodiments.

Referring to FIGS. 1-3, views of a manual food processor 100 are shown, according to some embodiments. FIG. 1 shows a perspective view of the manual food processor 100 in a closed state, FIG. 2 shows a side view of the manual food processor 100 in a closed state, and FIG. 3 shows a perspective view of the manual food processor 100 in an open state. The manual food processor 100 is operable by a user to process food, for example to cut (slice, divide, dice, wedge, etc.) a foodstuff. The manual food processor 100 is configured to be operated manually, i.e., under forces exerted by users (e.g., in contrast to having a motor therein). As described in detail below, the manual food processor 100 is configured to be operated by a user in an efficient and intuitive manner to easily cut foodstuffs, with the manual food processor 100 configured such that the foodstuffs can be easily positioned at the manual food processor, cut, and collected after cutting. The manual food processor 100 is also configured to facilitate easy cleaning of the manual food processor, including components thereof that may be in repeated contact with foodstuffs. The manual food processor 100 may also facilitate easy customization and alteration to allow for different cutting patterns, cut sizes, etc. These and other advantages are shown in detail by the following description.

As shown in FIGS. 1-3, the manual food processor 100 includes a base frame 101, a base platform 102 positioned at the base frame 101, a pair of supports 104 extending from the base frame 101, a first shelf 106 supported by the pair of supports 104, a pair of guide rails 110 extending from the first shelf 106, a second shelf 108 slidable along the pair of guide rails 110, and a handle mechanism 112 coupled to the guide rails 110 and the second shelf 108. The (lower) first shelf 106 (e.g., platen, plate, platform, etc.) is configured to receive a blade cartridge 116, and the (upper) second shelf 108 (e.g., platen, plate, platform, etc.) is configured to receive a pusher block cartridge 114.

FIGS. 1-2 show the manual food processor 100 in a closed position, where the first shelf 106 and the second shelf 108 are positioned proximate one another (e.g., abutting, touching), with the pusher block cartridge 114 interfacing with the blade cartridge 116. The handle mechanism 112 is configured to be manipulated by a user to cause the second shelf 108 to slide along the guide rails 110 away from the first shelf 106 to an open position (as shown in FIG. 3) where the first shelf 106 is separated from the second shelf 108. The handle mechanism 112 is configured to be manipulated by a user to cause the second shelf 108 to slide along the guide rails 110 from the open position of FIG. 3 toward the first shelf 106 to the closed position shown in FIGS. 1-2.

Figure 7:
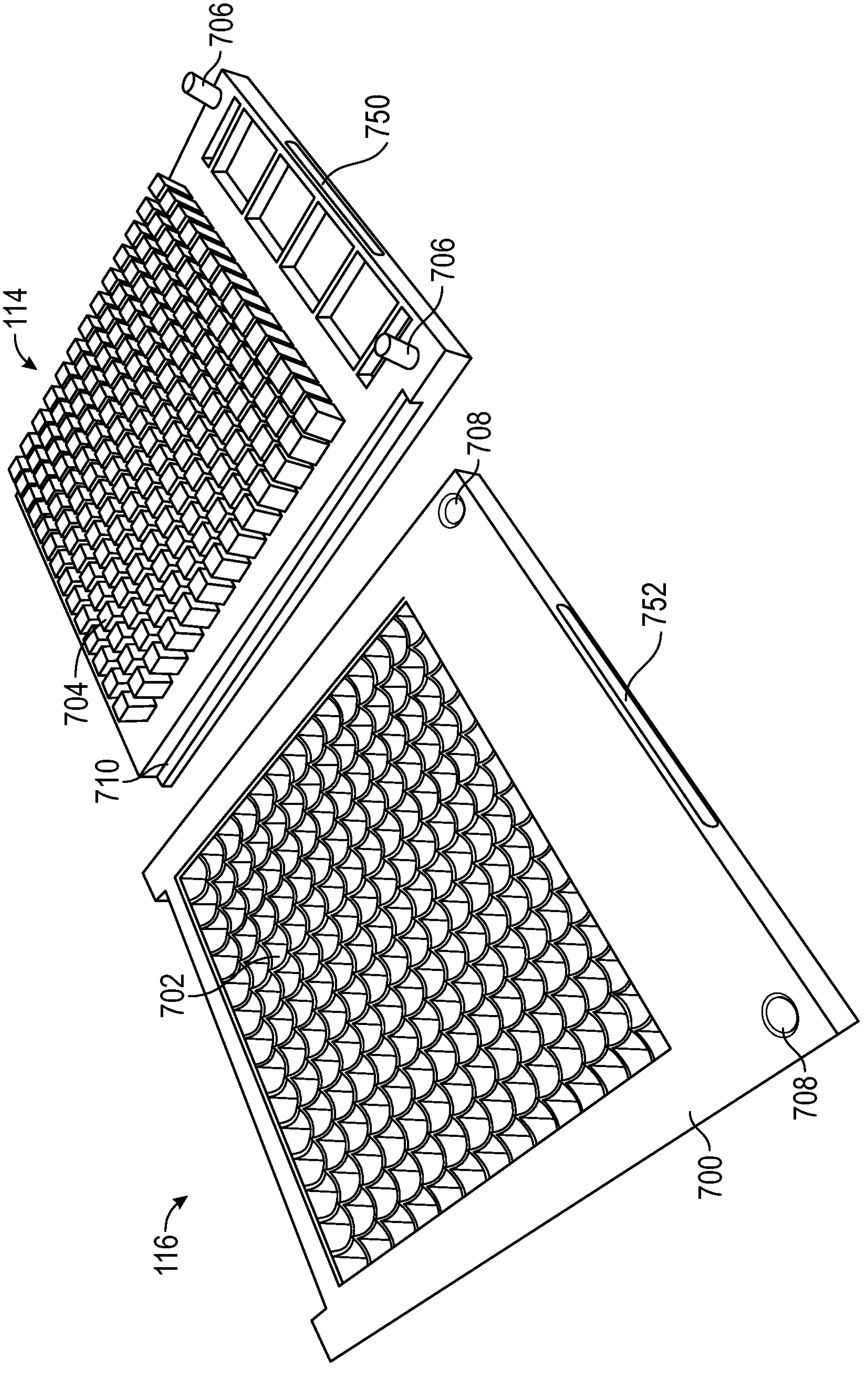
FIG. 7 is a view of the cartridges removed from the manual food processor of FIGS. 1-6, according to some embodiments.

When the manual food processor 100 is in the open state (as shown in FIG. 3), foodstuff can be placed on the blade cartridge 116 (at the first shelf 106) between the blade cartridge 116 and the pusher block cartridge 114. The handle mechanism 112 can then be manipulated to move the pusher block cartridge 114 and the second shelf 108 along the guide rails 110 to the first shelf 106 and the blade cartridge 116. The pusher block cartridge 114 is configured to push the food stuff through the blade cartridge 116, causing the food stuff to be cut by the blade cartridge 116 and to fall from the first shelf 106 towards the base platform 102. Examples of a pusher block cartridge 114 and blade cartridge 116 are shown in FIG. 7 and described in detail with reference thereto below.

The base platform 102, the pair of supports 104, and the first shelf 106 are arranged as a C-shaped frame that allows a receptacle (container, bowl, box, tray, etc.) to be easily positioned on the base platform 102 and under the first shelf 106 from multiple directions. Receptacles of various sizes (e.g., length, width, or other dimensions) and of any shape can be positioned under the first shelf 106, so long as a height of the receptacle is less than the distance between the base platform 102 and the first shelf 106, including receptacles of sizes which exceed the length and width dimensions of the base platform 102 or the first shelf 106 (e.g., large trays, pans, baking sheets with areas greater than an area of the base platform 102). The base platform 102 is also shown to include a curved back lip 118 positioned along an edge of the base platform 102 aligned with the supports 104 and configured to facilitate alignment of a container with the blade cartridge 116. When a container is positioned on the base platform 102 and under the first shelf 106 and the foodstuff is forced through the blade cartridge 116 by the pusher block cartridge 114, the cut foodstuff falls directly into the container. The cut foodstuff can thereby be easily collected and removed by a user from the manual food processor 100. In some embodiments, the base platform 102 can be removed from the frame 101 for easy cleaning. The base platform 102 can thus collect any spills, debris, etc. associated with operating the manual food processor 100, protect a countertop supporting the base platform 102 from contact with such spills, debris, etc., and facilitate easy cleanup following or during use of the manual food processor 100. The curved back lip 118 is configured to assist in the alignment of, and provide a backstop for, the container on the base platform 102 under the first shelf 106.

Figure 15:
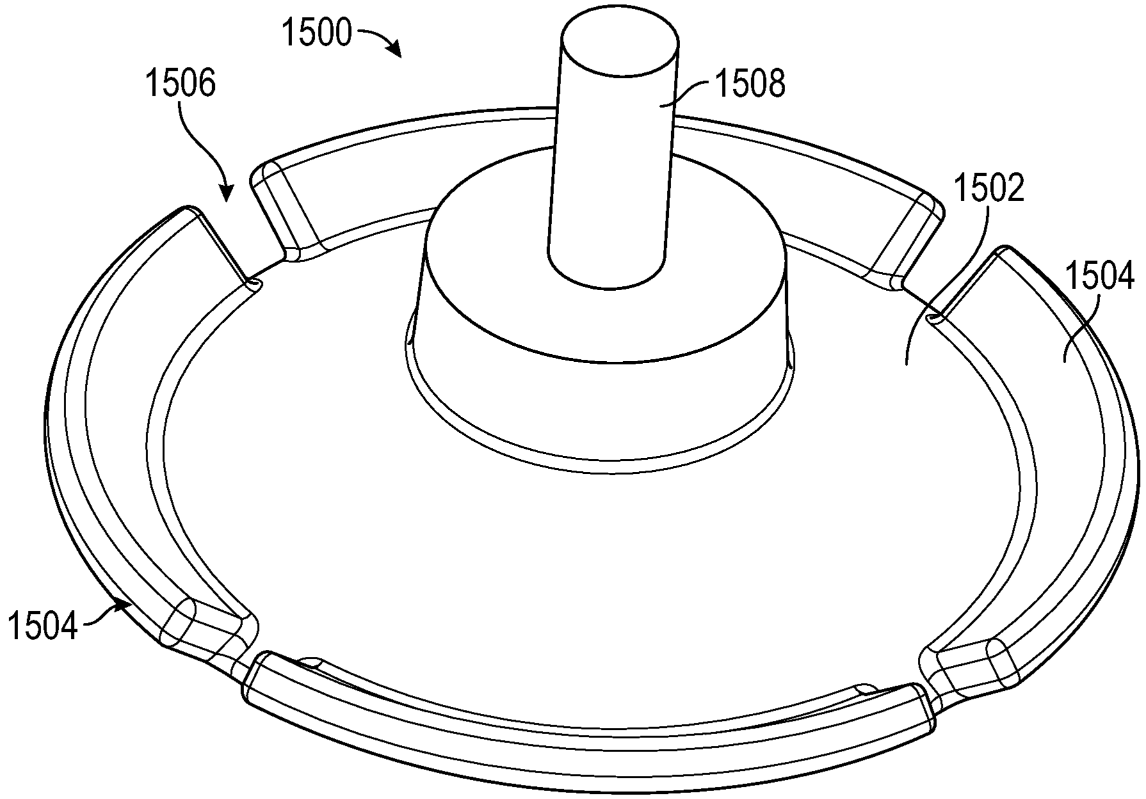
FIG. 15 is a view of a suction cup for use with a manual food processor, according to some embodiments.

As shown in FIGS. 1-3, the base frame 101 is supported by multiple feet 120. The feet 120 may be threaded to allow for fine height adjustment to ensure that the manual food processor 100 is stably supported by a horizontal surface (e.g., counter, table, shelf, etc.). In some embodiments, some or all of the feet 120 include a suction cup 1500 configured to substantially prevent movement of the base platform 102 during operation of the manual food processor 100. In the example shown, suction cups 1500 are positioned at two front feet 120 of the manual food processor 100. An example of a suction cup 1500 for use with the manual food processor 100 is shown in FIG. 15 and described with reference thereto below.

The handle mechanism 112 is shown to have two sides, where each side includes a first pivot point 122 positioned at the second shelf 108, a second pivot point 124 positioned at a top end **125*a*/125*b* of a guide rail 110, a first member 126*a*/126*b* extending from the first pivot point 122, and a second member 128 extending from the second pivot point 124. Each first member 126*a*/126*b* connects with a second member 128 at a third pivot point 130. The handle mechanism 112 is thereby pivotally coupled to the second shelf 108 and pivotally coupled to the top ends 125*a*, 125*b* of the guide rails 110. The handle mechanism 112, the guide rails 110, and the second shelf 108** form an actuation assembly.

The first members **126*a*, 126*b* are joined by a grip 132 that extends between the first members 126*a*, 126*b*. The grip 132 is configured to be manipulated, held, grabbed, pushed, lifted, etc. by a user. In some embodiments the grip 132 includes a surface pattern configured to reducing slipping and provide a user with a reliable hold of the handle mechanism 112. For example, as shown in FIGS. 1-3, the grip includes multiple parallel ridges arranged perpendicular to a direction of movement of the grip during use of the manual food processor 100. The grip 132 may also be provided with a non-slip texture (e.g., a textured surface). In some embodiments, the material of the grip 132 is selected to resist slipping of a hand on the grip 132. Movement of the grip 132 causes movement of the second shelf 108 relative to the first shelf 106**.

Each first member **126*a*/126*b* is shown as an L-shaped bar with a fulcrum 134 extending from a long side of the L-shaped bar. The fulcrum 134 is pivotally connected to the second shelf 108 at the first pivot point 122. A third pivot point 130 is positioned at a distal end of the short side of the L-shaped first member 126*a*/126*b*. The grip 132 is positioned at the distal end of the long side of the L-shaped first members 126***a*/126*b* (i.e., such that the grip 132 is positioned at an end of each first member 126*a*/126*b* opposite the corresponding third pivot point 130). Each first member 126*a*/126*b* is thereby configured to separately pivot relative to both the second shelf 108 and the second member 128.

The second member 128 is shown as a straight bar that extends from the second pivot point 124 to the third pivot point 130. Each second member 128 is configured to separately pivot relative to the corresponding top end 125*a*/125*b* of the guide rail 110 and relative to the corresponding first member 126*a*/126*b* while remaining coupled to both the top ends 125*a*, 125*b* of the guide rails 110 and the corresponding first member 126*a*/126*b*. A cross piece 136 extends between the top ends 125*a*, 125*b* of the guide rails 110.

Movement of the grip 132 causes rotation of the first members 126*a*, 126*b* about the first pivot points 122, which causes rotation of the second members 128 relative to both the second pivot points 124 and the third pivot points 130. Due the connection between the second shelf 108 and the top ends 125*a*, 125*b* of the guide rails 110 via the multi-pivot structure of the handle mechanism, movement of the grip 132 causes movement of the second shelf 108. To move the second shelf 108 upwards along the guide rails 110, the grip 132 is moved upwards. To move the second shelf 108 downwards along the guide rails 110, the grip 132 is moved downwards. The grip 132 may travel along a curved trajectory that provides a natural and intuitive operation for a user, while the handle mechanism 112 remains substantially contained in a volume above the second shelf 108 throughout operation of the handle mechanism 112, thereby reducing the space required to operate the manual food processor 100. Additionally, the multi-pivot design of the handle mechanism 112 provides a multi-lever action that reduces the amount of force that a user would need to exert on the grip 132 to move the second shelf 108 along the guide rails 110 and/or to push foodstuffs through a blade cartridge 116 with a pusher block cartridge 114 retained by the second shelf 108. The mechanical advantage provided by the multi-pivot design enhances the user-provided force, for example by a ratio of approximately 3:1 (i.e., such that a force exerted by a user is tripled by the mechanics of the multi-lever or linkage design).

The manual food processor 100 is also shown to include a lock pin 140 positioned at the top end 125*a* of a guide rail 110. The lock pin 140 is configured to selectively prevent downward movement of the first member 126*a* of the handle mechanism 112, thereby selectively preventing downward movement of the second shelf 108 and pusher block cartridge 114. In the example shown, the lock pin 140 is spring-loaded (biased) to extend into the path travelled by the first member 126*a* during operation of the manual food processor 100. The first member 126*a* includes a sloped notch 142 (e.g., groove, recess, etc.) that aligns with the lock pin 140 when in certain positions. When the second shelf 108 is moved from the closed position to the open position, the sloped notch 142 engages the lock pin 140, with the sloping of the notch 142 pushing the spring-loaded lock pin 140 away from the first member 126*a* to allow the first member 126*a* to move upwardly past the lock pin 140. When the first member 126*a* has passed the lock pin 140, the lock pin 140 is caused by a springing quality to return to a position in the path of the first member. The lock pin 140 is then positioned below the first member 126*a*, and prevents the first member 126*a* from downward movement. The manual food processor 100 is thereby prevented from returning to the closed position, allowing a user to position a food item on the blade cartridge 116 without requiring the user to manually prevent downward movement of the pusher block cartridge 114 (e.g., which may otherwise be caused by the weight of the handle mechanism 112, the second shelf 108, and the pusher block cartridge 114). The lock pin 140 may include a ring, grip, handle, etc. that can be pulled by a user to compress the spring of the lock pin 140 and to allow the handle mechanism 112 to move freely. In some embodiments, the lock pin 140 is a retractable spring plunger locking pin configured to be rotated between an orientation in which the lock pin 140 is allowed to move freely and an orientation in which the lock pin 140 is retracted and held out of the path of the first member 126*a* (i.e., in an non-locking position that allows free movement of the first member 126*a*). These orientations may be offset by approximately ninety degrees.

The manual food processor 100 is thereby configured to provide user-friendly, reliable, efficient, and intuitive operation of the manual food processor 100 to receive foodstuffs, cut the foodstuffs, and collect the cut foodstuffs.

Referring now to FIGS. 4-7, several views of the manual food processor 100 illustrating a workflow for removing the pusher block cartridge 114 and the blade cartridge 116 are shown, according to some embodiments. As detailed below, the pusher block cartridge 114 and the blade cartridge 116 are easily removable from the manual food processor 100. For example, the pusher block cartridge 114 and the blade cartridge 116 can be removed for cleaning of the pusher block cartridge 114 and the blade cartridge 116. As another example, the pusher block cartridge 114 and the blade cartridge 116 can be removed and replaced with a different pusher block cartridge 114 and/or different blade cartridge 116 that provides a different pattern or size of divisions for the foodstuff processed by the manual food processor 100. As another example, the blade cartridge 116 can be removed when the blades dull after repeated use, and replaced with a new blade cartridge 116 having new, sharper blades. Many purposes and advantages relating to removing the pusher block cartridge 114 and/or blade cartridge 116 are possible.

Figure 4:
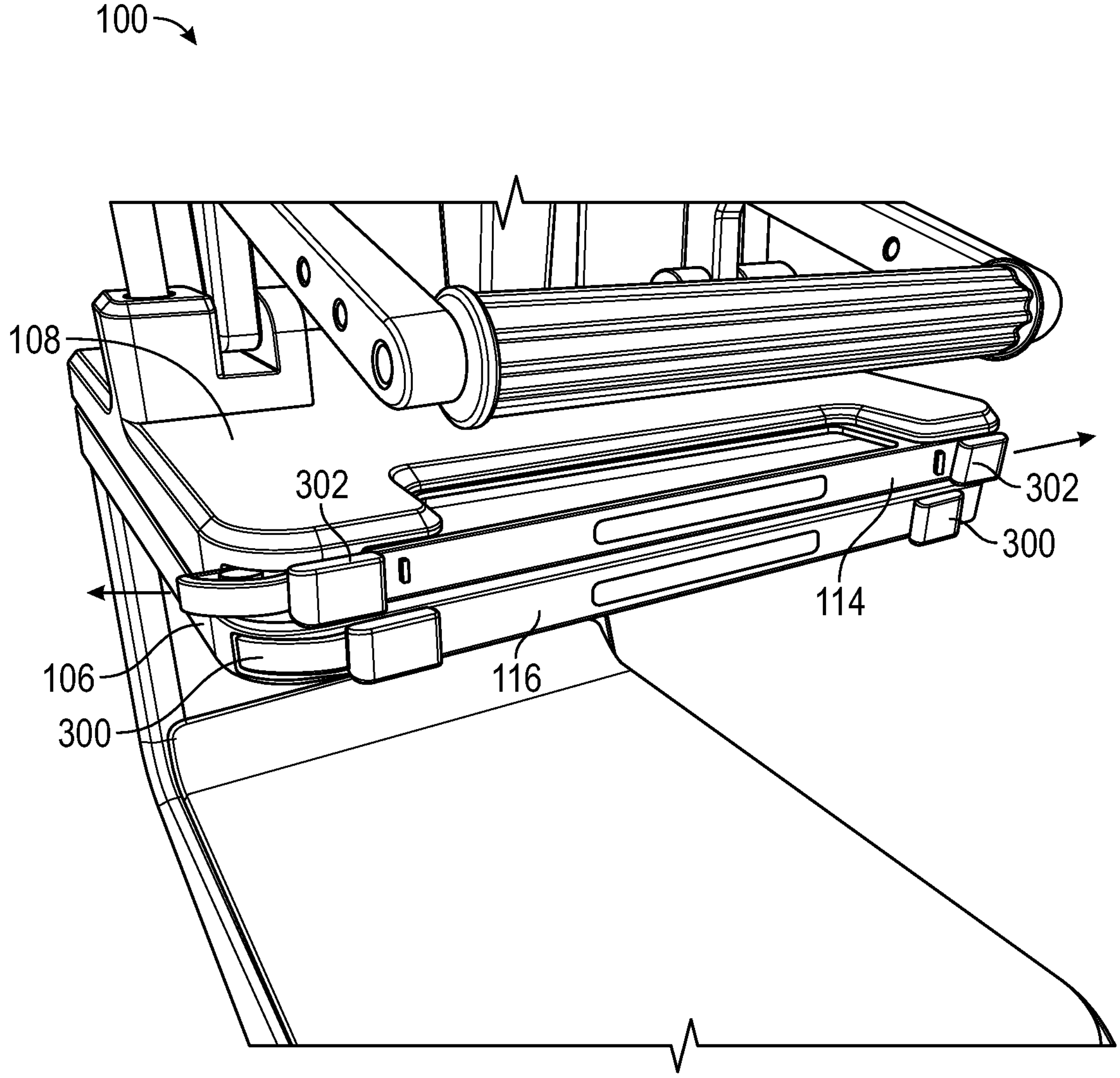
FIG. 4 is a view of the manual food processor of FIGS. 1-3 showing a first step in removing cartridges of the manual food processor, according to some embodiments.

As shown in FIG. 4, the blade cartridge 116 is received by the first shelf 106 and the pusher block cartridge 114 is received by the second shelf 108. The first shelf 106 includes a retaining mechanism, shown as first sliders 300 (e.g., locking tabs, release tabs, etc.) configured to selectively retain the blade cartridge 116 at the first shelf 106. The second shelf 108 includes a retaining mechanism, shown as second sliders 302 (e.g., locking tabs, release tabs, etc.) configured to selectively retain the pusher block cartridge 114 at the second shelf 108. As shown in FIG. 4, the first sliders 300 are in a locking position, where the first sliders 300 engage the blade cartridge 116 and restrict movement of the blade cartridge 116 relative to the first shelf 106.

Figure 5:
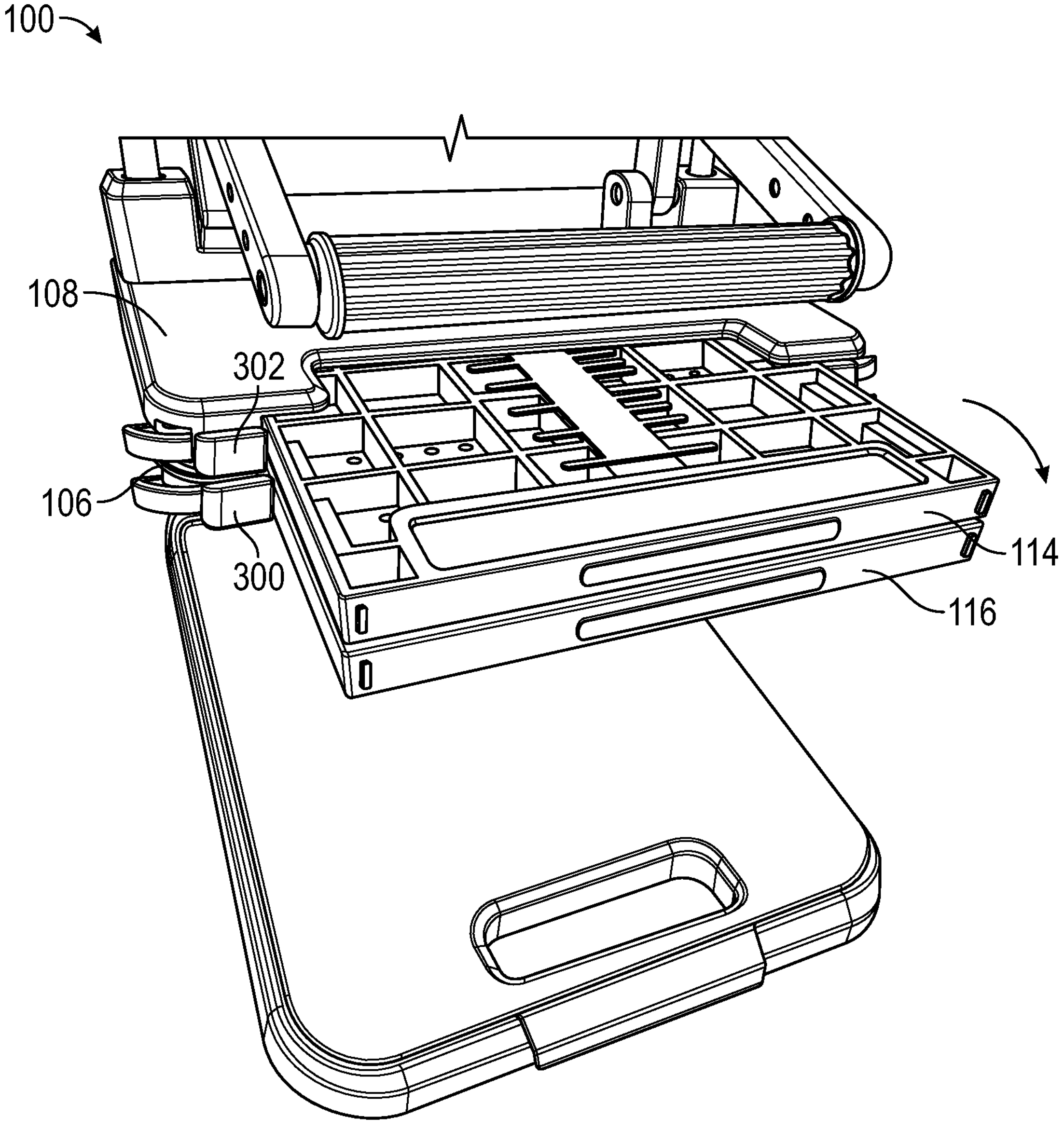
FIG. 5 is a view of the manual food processor of FIGS. 1-4 showing a second step in removing cartridges of the manual food processor, according to some embodiments.

FIG. 4 illustrates that the first sliders 300 and the second sliders 302 are configured to be slid (translated, moved, etc.) from the locking positions (as shown for the first sliders 300 in FIG. 4) to unlocked positions (as shown for the second sliders 302 in FIG. 5). In the example shown, the second sliders 302 are moved outwardly from the second shelf 108 to reach the unlocked position of FIG. 4. In the unlocked position, the second sliders 302 are disengaged from the pusher block cartridge 114. In other words, the second sliders are repositioned to remove the restriction on movement of the pusher block cartridge 114. Both the first sliders 300 and the second sliders 302 can be moved between the locking positions and the unlocked positions illustrated in FIG. 4.

As shown in FIG. 5, with the first sliders and the second sliders in the unlocked positions, the blade cartridge 116 and the pusher block cartridge 114 can be removed from the first shelf 106 and the second shelf 108, respectively. As shown in FIG. 5, the blade cartridge 116 is configured to slide out of the first shelf 106 in a plane defined by the first shelf 106 (e.g., substantially perpendicular to the guide rails 110). The blade cartridge 116 is removable from the first shelf 106 via a path which is blocked by the first sliders 300 when the first sliders 300 are in the locked position (as shown for the first sliders 300 in FIG. 4) and which is vacated by the first sliders 300 when the first sliders 300 are in the unlocked position (as shown for the second sliders 302 in FIG. 4). FIG. 5 also shows that the pusher block cartridge 114 is configured to slide out of the second shelf 108 in a plane defined by the second shelf 108 (e.g., substantially perpendicular to the guide rails 110). The pusher block cartridge 114 is removable from the second shelf 108 via a path which is blocked by the second sliders 302 when the second sliders 302 are in the locked position of FIG. 3 and which is vacated by the second sliders 302 when the second sliders 302 are in the unlocked position of FIG. 4.

Figure 6:
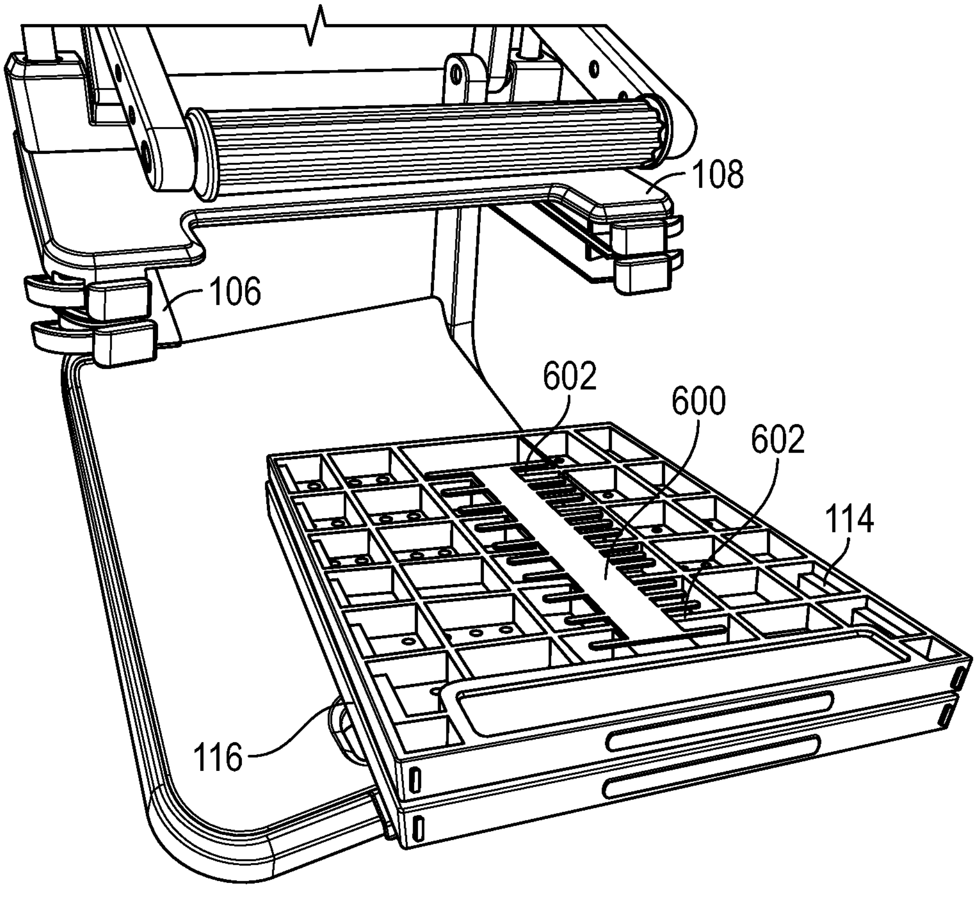
FIG. 6 is a view of the manual food processor of FIGS. 1-5 with the cartridges removed, according to some embodiments.

FIG. 5 shows the blade cartridge 116 and the pusher block cartridge 114 partially removed (e.g., in the process of being removed) from the manual food processor 100, while FIG. 6 shows the pusher block cartridge 114 completely removed from the manual food processor 100. In the example of FIGS. 4-6, the blade cartridge 116 and the pusher block cartridge 114 are removed together, for example by a user using one hand to execute the process of removing the blade cartridge 116 and the pusher block cartridge 114. In other examples, the blade cartridge 116 and the pusher block cartridge 114 can be removed independently, for example while the manual food processor 100 is in the open position.

As shown in FIG. 6, a cleaning tool 600 can be included with the pusher block cartridge 114. The cleaning tool 600 is configured for use in cleaning the pusher block cartridge 114, for example as described in further detail below with reference to FIG. 19. FIG. 6 illustrates that the pusher block cartridge 114 and the second shelf 108 can be configured to house the cleaning tool 600 between the pusher block cartridge 114 and the second shelf 108. For example, the pusher block cartridge 114 may include a recess 602 in which the cleaning tool 600 can be received. The recess 602 may be located on a top side of the pusher block cartridge 114, i.e., opposite a bottom side of the pusher block cartridge 114 which contacts foodstuffs during operation of the manual food processor 100. The recess 602 may have a shape corresponding to a shape of the cleaning tool 600. The cleaning tool 114 can thereby be removeably retained in the pusher block cartridge 114.

Referring now to FIG. 7, a view of a pusher block cartridge 114 and a blade cartridge 116 is shown, according to some embodiments. The pusher block cartridge 114 and the blade cartridge 116 are shown as removed from the manual food processor 100.

The blade cartridge 116 includes a frame 700 and a plurality of blades 702 coupled to the frame 700. The frame 700 is shown as having a rectangular shape having a rectangular (e.g., square) opening through the frame 700. The plurality of blades 702 are positioned in the rectangular opening. In the example shown, the plurality of blades 702 are arranged in a mesh, with a first subset of the plurality of blades extending in a first direction and a second subset of the plurality of blades extending in an orthogonal direction within the plane defined by the frame 700. Open spaces are left between the blades. The sharp edges of the plurality of blades are oriented in a common direction, with the blade cartridge 116 configured to be inserted into the first shelf 106 with the sharp edges of the blades pointing upwards (i.e., towards the second shelf 108). The blade cartridge 116 is thereby configured for dicing a food product. In other embodiments, various patterns and arrangements of blades are possible. For examples, in some embodiments, the blades of a blade cartridge may all be substantially parallel, such that the blade cartridge is configured for slicing a food product. In other embodiments, the blades may be arranged to meet at approximately a center point of the blade cartridge, such that the blade cartridge is configured for wedging a food product. In other embodiments, the blades may be arranged in an ornamental pattern to provide a food stuff with that ornamental pattern after cutting. In the embodiments shown, the blade cartridge 116 has an approximately square cutting area with dimensions of approximately 7 inches by approximately 7 inches.

The pusher block cartridge 114 includes a plurality of projections 704 extending from a bottom side of the pusher block cartridge 114 (with 'bottom' defined relative to the orientation of the pusher block cartridge 114 when received by the second shelf 108 as in FIGS. 1-4). The projections 704 are arranged in a grid (array) that corresponds to the spaces between the blades 702 of the blade cartridge 116. Spaces between the projections 704 correspond to the positions of the blades 702 of the blade cartridge 116. The projections 704 are configured to extend between the blades 702 of the blade cartridge 116. That is, when the manual food processor 100 is in the state shown in FIGS. 1-2, the projections 704 are positioned between the blades 702 and the projections 704 are separated from one another by the blades 702. The projections 704 may be hollow to reduce the weight of the pusher block cartridge 114.

The pusher block cartridge 114 is shown to include posts 706 that extend from the pusher block cartridge 114 and correspond to holes 708 on the blade cartridge 116. The posts 706 and holes 708 may facilitate alignment of the pusher block cartridge 114 with the blade cartridge 116. The pusher block cartridge 114 is also shown to include a lip or groove 710 configured to facilitate insertion of the pusher block cartridge 114 into the second shelf 108.

In operation of the manual food processor, a foodstuff is placed on the blades 702 (i.e., on a sharp upper edge of the blades 702). A user can manipulate the handle mechanism 112 to force the pusher block cartridge 114 into the foodstuff, thereby forcing the foodstuff through the blade cartridge 116. The foodstuff is cut by the blades 702 and passes through the openings between the blades 702. The pusher block cartridge 114 can be forced all the way into the closed position, where the projections 704 extend between the blades 702 and substantially ensure that entirety of the foodstuff is cut by the blades and passes through the blade cartridge 116. The number and arrangement of the blades in the blade cartridge 116 and of the projections of the pusher block cartridge 114 may be different for different implementations of the blade cartridge 116 and the pusher block cartridge 114, allowing for customization and adjustment of the cutting by the manual food processor 100 by removing and replacing the blade cartridge 116 and the pusher block cartridge 114.

FIG. 7 also shows the pusher block cartridge 114 as including a first indicator 750 and the blade cartridge 116 as including a second indicator 752. The first indicator 750 is a visible panel (e.g., patch, sticker, coloring, design, symbol, text, indicia, etc.) provided on the front face of the pusher block cartridge 114 such that the first indicator 750 is visible when the pusher block cartridge 114 is received by the second shelf 108. The second indicator 752 is a visible panel (e.g., patch, sticker, coloring, design symbol, text, indicia, etc.) provided on the front face of the blade cartridge 116 such that the second indicator 752 is visible when the blade cartridge 116 is received by the first shelf 106. The first indicator 750 is configured to visually communicate a configuration of pusher block cartridge 114 to a person viewing the first indicator 750. The second indicator 752 is configured to visually communicate a configuration of the blade cartridge 116 to a person viewing the second indicator 752.

For example, the second indicator 752 may be a first color (e.g., blue) for a blade cartridge 116 with the blades having a first spacing or pattern (e.g., 1-square-inch dice), or a second color (e.g., red) for a blade cartridge 116 with the blades having a second spacing or pattern (e.g., quarter-inch slice). Different colors (e.g., blue, green, yellow, red, orange, purple, etc.) can be selected for each of various blade arrangements. The first indicator 750 is provided with a matching color. In this example, the first indicator 750 is the first color (e.g., blue) when the pusher block cartridge 114 is configured to interface with blades having the first spacing or pattern (i.e., to match a second indicator 752 having the first color), and the first indicator 750 is the second color (e.g., red) when the pusher block is configured to interface with blades having the second spacing or pattern (i.e., to match a second indicator 752 having the second color). Advantageously, the first indicator 750 and the second indicator 752 provide a user with a quick and easy way to match up a pusher block cartridge 114 with a corresponding blade cartridge 116. Additionally, the first indicator 750 and the second indicator 752 provide the user with an easy way to determine the size or pattern of cut simply by observing the first indicator 750 and the second indicator 752 (e.g., when visually inspecting the manual food processor 100 without the need to look at the blades themselves). Furthermore, a user can have multiple sets (i.e., pusher block cartridge 114 plus blade cartridge 116) to choose from (i.e., multiple available cutting patterns/sizes) and can store them (e.g., on a shelf, in a cabinet, etc.) with the first indicator 750 and the second indicator 752 visible for each set. In this scenario, the user can select the desired cut pattern/size simply by picking and matching the set with indicators 750, 752 having the desired color.

Figure 8:
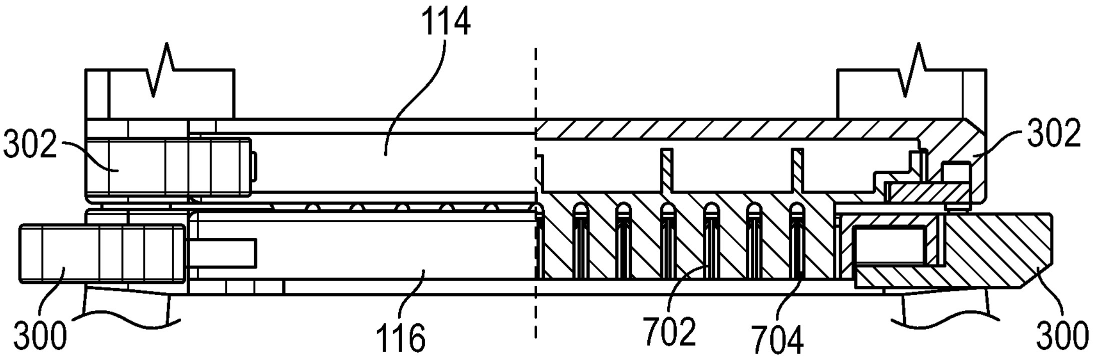
FIG. 8 is a front view of a retaining mechanism of the manual food processor, according to some embodiments.

Referring now to FIGS. 8-13, various close-up views of at least one of the sliders 300 of the first shelf 106 and/or the sliders 302 of the second shelf 108 in various embodiments, denoted in some cases as slider 900. FIG. 8 shows a combination front view and cross-section view of the manual food processor 100. As shown in FIG. 8, the second sliders 302 are in the locked (or retaining) position and the first sliders 300 are in the unlocked (or non-retaining) position. FIG. 8 illustrates that, from the front perspective, the second sliders 302 obscure a portion of the pusher block cartridge 114. The second sliders 302 thereby obstruct the pusher block cartridge 114 from being removed from the second shelf 108 in a direction pointing out-of-the page from the perspective shown in FIG. 8. In the locked position, the second sliders 302 share a form factor with the second shelf 108. FIG. 8 further illustrates that, from the front perspective, the first sliders 300 are moved laterally and outwardly such that the first sliders 300 are in the unlocked position where the first sliders 300 do not obscure the blade cartridge 116. Movement of the blade cartridge 116 is thus not obstructed by the first sliders 300 when in the position shown in FIG. 8. In the unlocked position, the first sliders 300 extend outwardly from the form factor of the first shelf 106. Advantageously, the first sliders 300 remain coupled to the first shelf 106 in the unlocked position, such that the first sliders 300 are easily retained and cannot be lost or misplaced during the process of removing and replacing a blade cartridge 116.

FIG. 8 also illustrates that, in the closed position of FIG. 8 (e.g., as in FIGS. 1 and 2), the pusher block cartridge 114 interfaces with the blade cartridge 116. That is, the multiple protrusions 704 of the pusher block cartridge 114 are positioned between the blades 702 of the pusher block cartridge 114. The protrusions 704 may have a height equal to, greater than, or less than a depth of the blade cartridge 116 in various embodiments, such that the protrusions may extend beyond the blades 702, may be co-extensive with the blades 702, or may protrude only partially across the spaces between the blades 702 in various embodiments.

Figure 9:
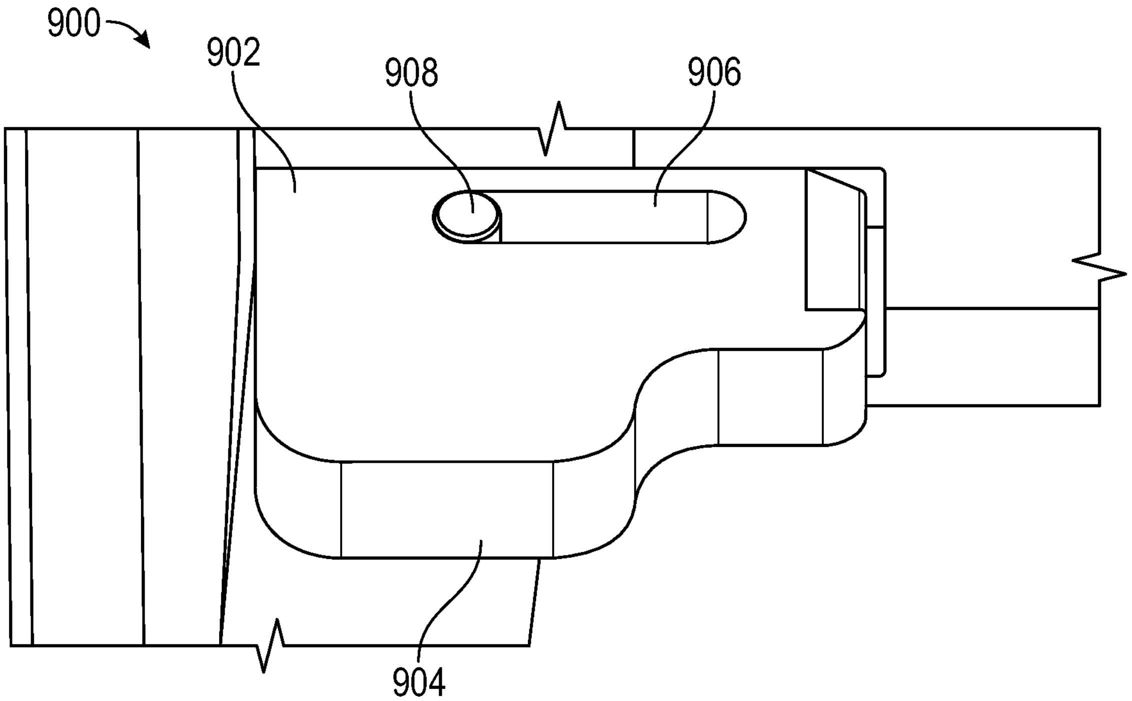
FIG. 9 is a detailed view of a slider of the retaining mechanism of the manual food processor, according to some embodiments.
Figure 10:
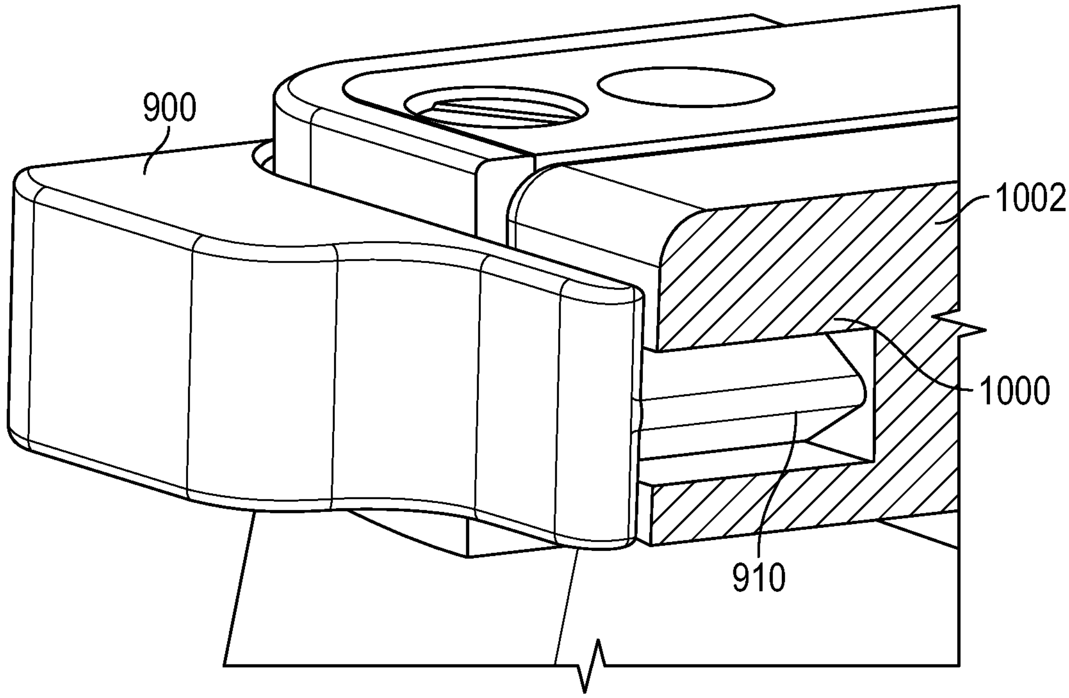
FIG. 10 is another view of the retaining mechanism of the manual food processor, according to some embodiments.
Figure 11:
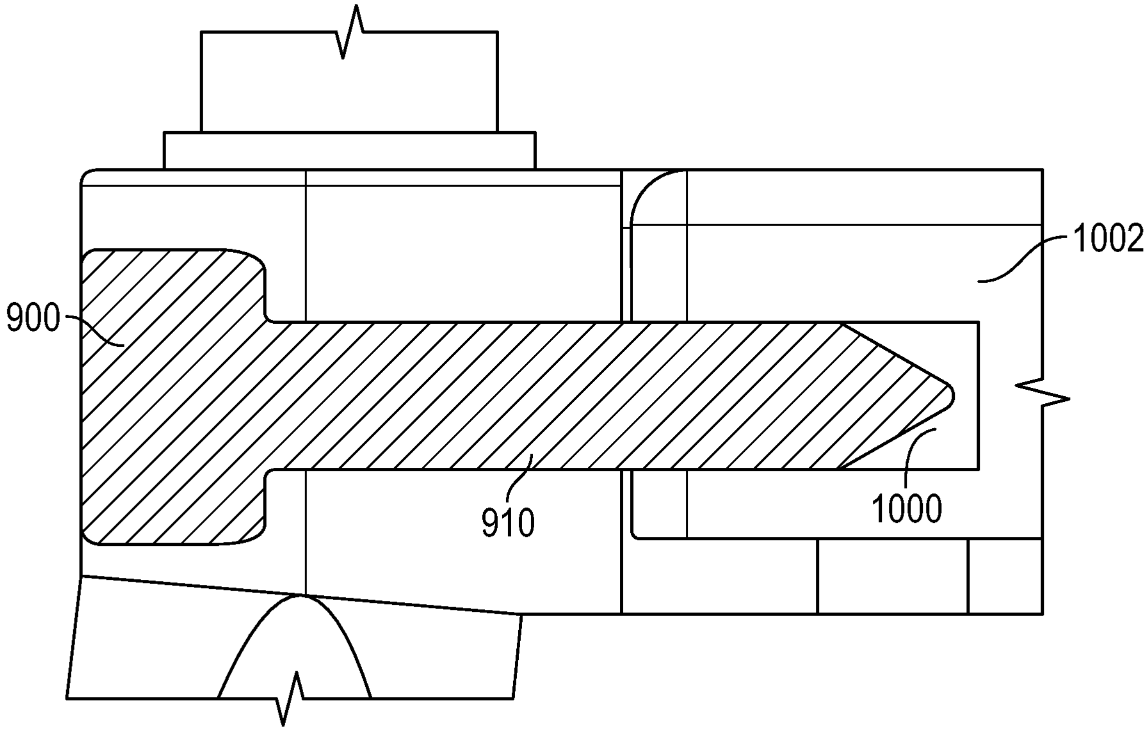
FIG. 11 is another view of the retaining mechanism of the manual food processor, according to some embodiments.

FIG. 9 shows a perspective view of a slider 900 (e.g., any one of sliders 300, 302). The slider 900 is shown to include a body portion 902, a tab portion 904, and a slot 906 extending through the body portion 902. A pin 908 extends through the slot 906. The pin 908 is coupled to the corresponding shelf 106, 108. The pin 908 is configured to be slidable along the slot, with the slot 906 and the pin 908 combining to define a range of motion of the slider 900 (e.g., of the body portion 902 and the tab portion 904. The body portion 902 is configured to move in and out of the locking position, obstructing movement of the cartridge in the locked position. The tab portion 904 is protrudes from the body portion 902 and is configured to be engaged by a user to slide the body portion 902 along the pin 908.

Figure 12A:
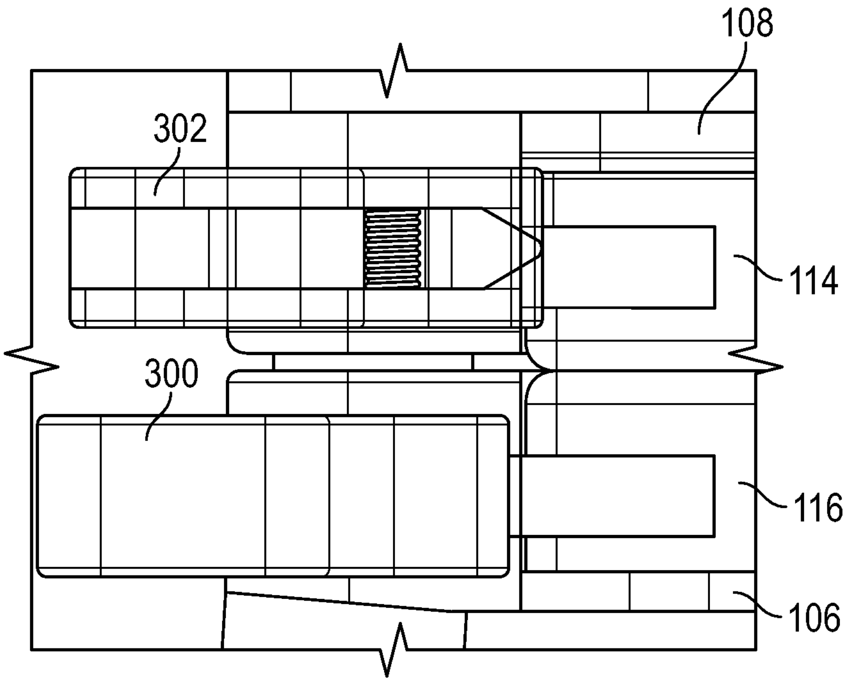
FIG. 12A is another view of the retaining mechanism of the manual food processor, according to some embodiments.
Figure 12B:
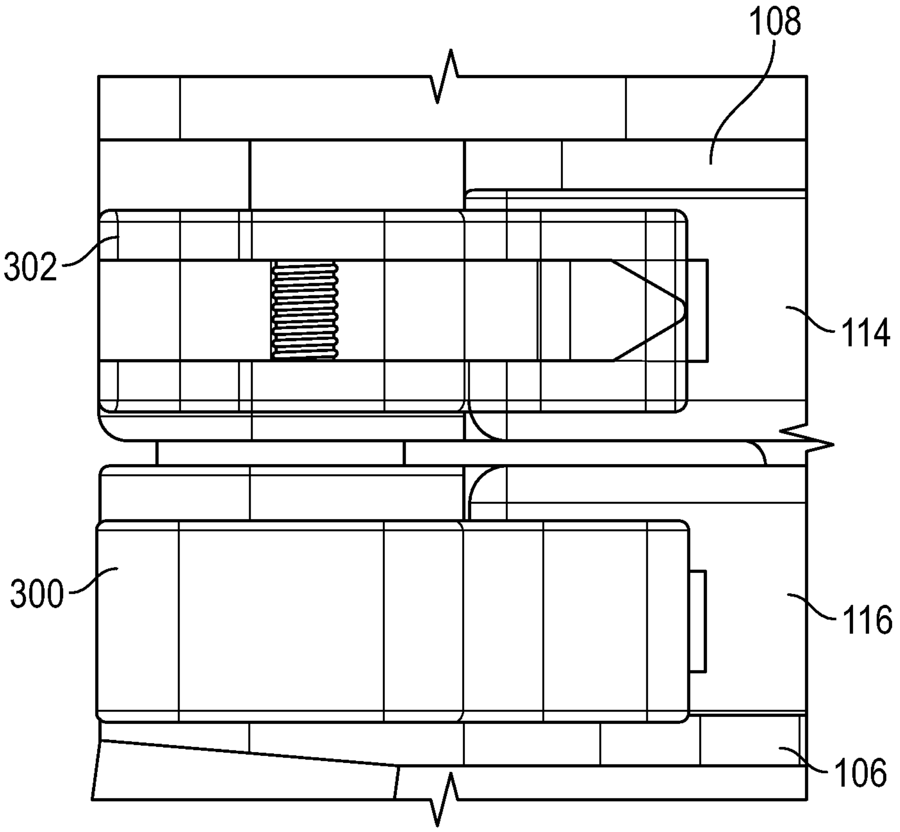
FIG. 12B is another view of the retaining mechanism of the manual food processor, according to some embodiments.

FIGS. 10-12B show various additional cross-section, cutaway, and translucent views of the slider 900. As illustrated in FIGS. 10-12B, the slider 900 may include a projection 910 that extends into an opening 1000 in the cartridge 1002 (e.g., the blade cartridge 116 or the pusher block cartridge 114). Movement of the cartridge 1002 may be substantially prevented by the presence of the projection 910 in the opening 1000. The projection 910 may have a pointed tip to facilitate insertion of the projection 910 into the opening 1000. FIG. 12A shows the sliders 300, 302 in the unlocked position, while FIG. 12B shows the sliders 300, 302 in the locked position.

Figure 13:
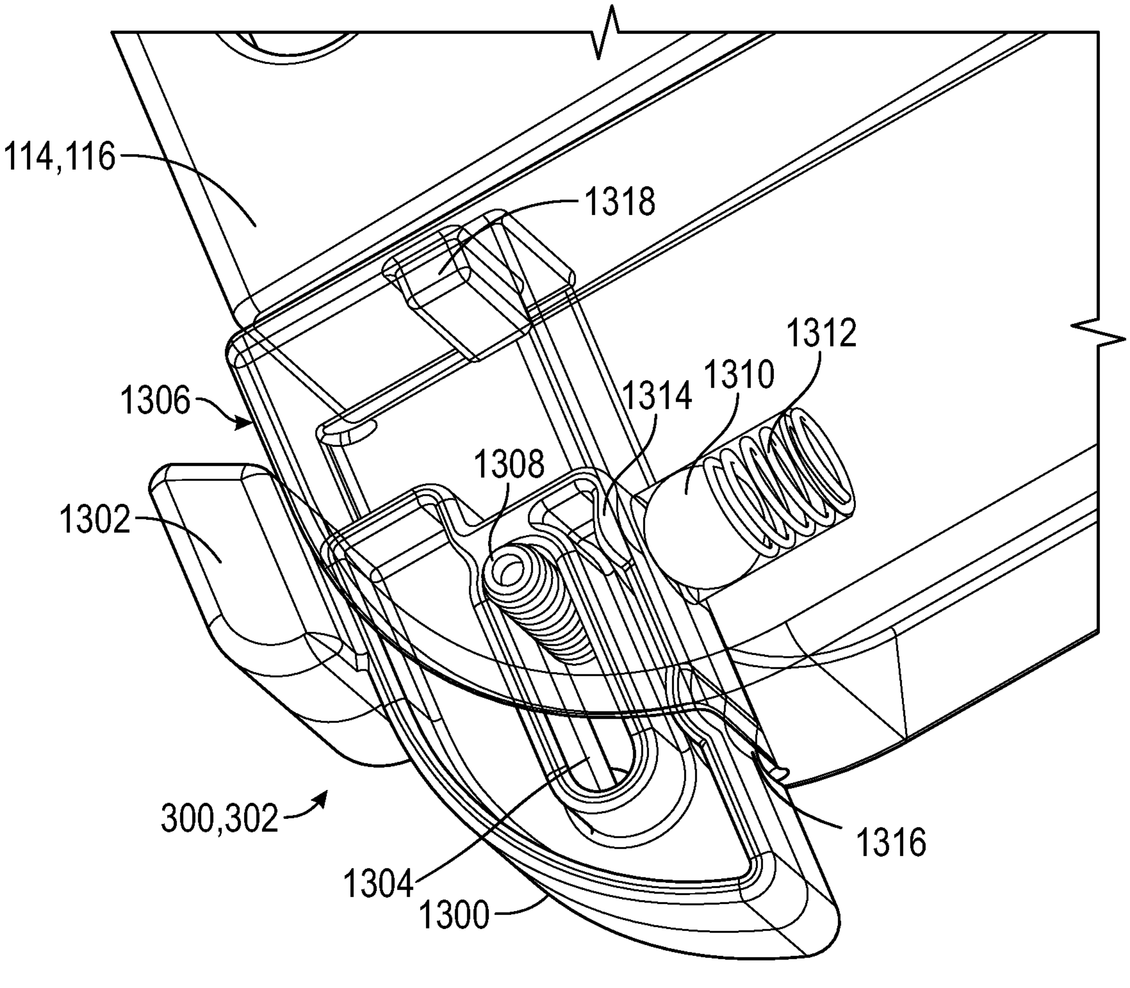
FIG. 13 is a perspective view of the retaining mechanism of the manual food processor, according to some other embodiments.

Referring now to FIG. 13, another embodiment of a slider 300, 302 is shown. As shown in FIG. 13, the slider 300, 302 includes a body 1300 and a tab 1302. The tab 1302 extends from a front side of the body 1300 and can be positioned in a path of movement of the pusher block cartridge 114 or blade cartridge 116 when the slider 300, 302 is in the locked position. The tab 1302 is also configured to provide a surface for interaction of a user with the slider 300, 302. A user can push the tab 1302 to move the body 1300 and the tab 1302 between the locked and unlocked positions.

As shown in FIG. 13, the body 1300 includes a slot 1304 and is received by a recess 1306 in the first shelf 106 or the second shelf 108. A shaft (e.g., pin, screw) 1308 is positioned in the recess 1306 and extends through the slot 1304. As the body 1300 moves, the shaft 1308 rides in the slot and allows the body 1300 to move along a path defined by the slot 1304. The shaft 1308 and the slot 1304 thereby restrict movement of the body 1300. As shown in FIG. 13, the pusher block cartridge 114 or the blade cartridge 116 may include a protrusion 1318 that extends into the recess 1306.

As shown in FIG. 13, a ball bearing 1310 and a spring 1312 are included and are configured to facilitate retention of the slider 300, 302 in the locked or unlocked position. As shown, the slider includes a first indentation 1314 and a second indentation 1316 on a backside of the body 1300. When the body 1300 is in the unlocked position as shown in FIG. 13, the ball bearing 1310 engages the first indentation 1314 and is biased towards the body 1300 by the spring 1312. Movement of the body 1300 is resisted by the interaction between the bearing 1310 and the first indentation 1314. When force is applied to slide the body 1300 to the locked position, the spring 1312 is compressed as the bearing 1310 disengages from the first indentation 1314 and facilitates movement of the body 1300 along the bearing 1310. When the body 1300 reaches the locked position, the spring 1312 forces the bearing 1310 into engagement with a second indentation 1316 in the body 1300. Movement of the body 1300 is resisted by the interaction between the bearing 1310 and the second indentation 1316. The spring 1312 and ball bearing 1310 thereby facilitate retention of the body 1300 in the locked or unlocked position and movement of the body 1300 between locked and unlocked positions.

Figure 14:
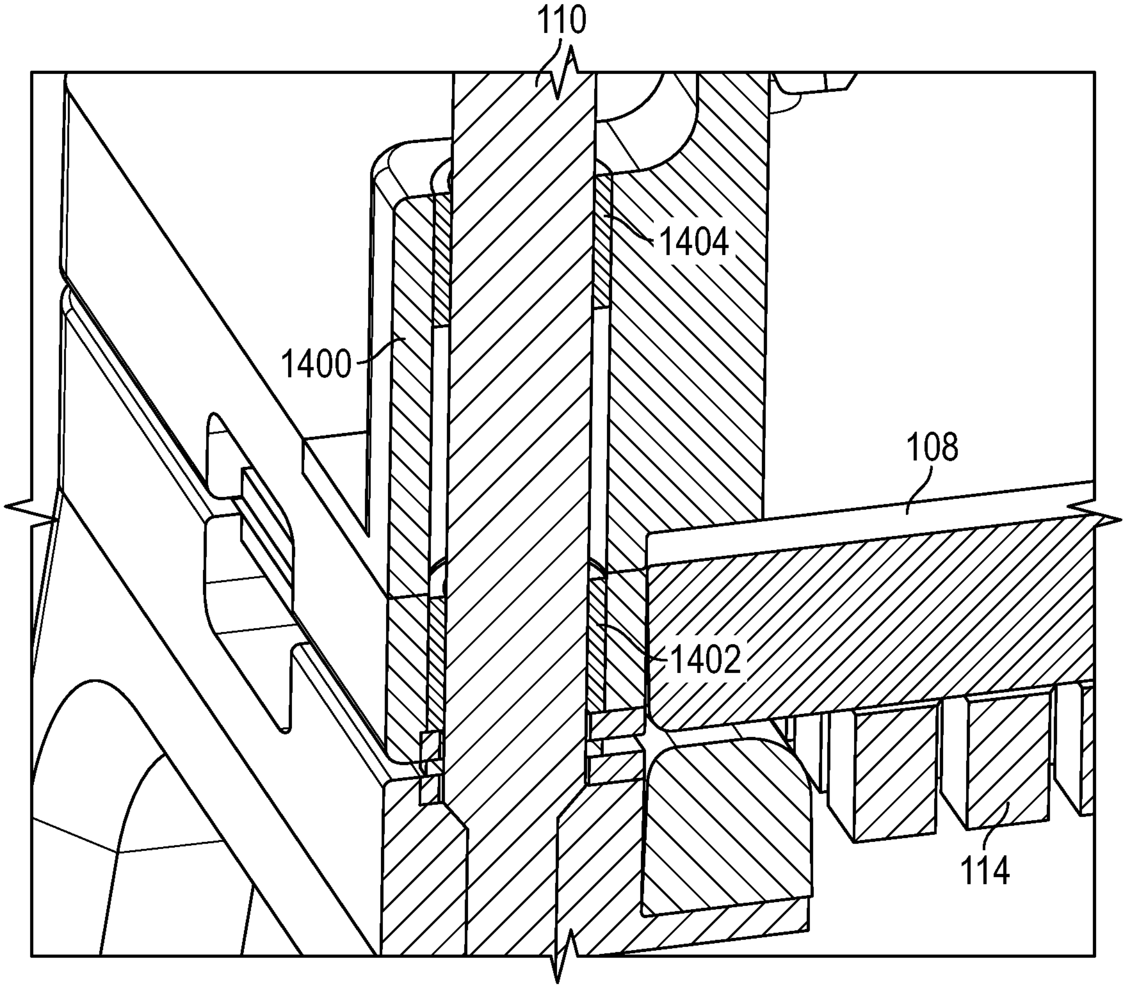
FIG. 14 is a cut-away view of a portion of the manual food processor of FIGS. 1-6, according to some embodiments.

Referring now to FIG. 14, a cut-away view of the manual food processor 100 is shown, according to some embodiments. In particular, FIG. 14 shows a cut-away view of a guide rail 110 and the second shelf 108 configured to slide along the guide rail 110. The second shelf 108 is shown as including a sleeve 1400 extending upwardly from the second shelf 108. The guide rail 110 extends through the sleeve 1400 and the second shelf 108. A first bearing 1402 is coupled to the second shelf 108 and is positioned to be substantially aligned with the pusher block cartridge 114, while a second bearing 1404 is coupled to and positioned in the sleeve 1400. The first bearing 1402 and the second bearing 1404 contact the guide rail 110, for example surrounding a circumference of the guide rail 110. The first bearing 1402 and the second bearing 1404 allow the second shelf 108 and the sleeve 1400 to slide along the guide rail 110. The second shelf 108 and the pusher block cartridge 114 can thereby be easily moved along a path defined by the guide rail 110.

Referring now to FIG. 15, a perspective view of a suction cup 1500 for use with the manual food processor 100 is shown, according to some embodiments. In some embodiments, one or more (e.g., one, two, three, four) of the feet 120 of the manual food processor includes an instance of the suction cup 1500. The suction cup 1500 is configured to provide a suction-based releasable coupling between the manual food processor 100 and a horizontal surface, for example a counter, table, workbench, cart, floor, or other working surface for the manual food processor 100. The suction cup 1500 may restrict movement of the manual food processor 100, including horizontal movement along the horizontal surface, vertical movement away from the horizontal surface, tipping/tilting/rotating of the manual food processor 100, and combinations thereof.

As shown in FIG. 15, the suction cup 1500 includes substantially-circular suction region 1502 and a circumferential lip 1504 extending around at least a majority of the suction region 1502. The suction cup 1500 is coupled to a cylindrical post 1508 that connects the suction cup 1500 to the manual food processor 100 to form a foot 120. The suction region 1502 includes a closed approximately-hemispherical section of pliable plastic or other material and is configured to provide a retaining force between a surface and the suction cup 1500. In the example shown, the lip 1504 extends upwardly from the suction region 1502. The lip 1504 is configured to be manipulated by a single digit or finger of a user to release the suction from the suction region 1502, for example by letting air into a space between the suction region 1502 and the surface. In particular, the lip 1504 allows a user to release the suction using a single finger, for example by pushing down on the lip 1504. This allows for easy disconnection of the suction cup 1500 from a horizontal surface supporting the manual food processor 100, thereby facilitating easy repositioning of the manual food processor 100. The lip 1504 additionally includes multiple (shown as four) channels 1506 through the lip 1504 to allow for fluid or other debris to flow off of the suction cup 1500.

Figure 16:
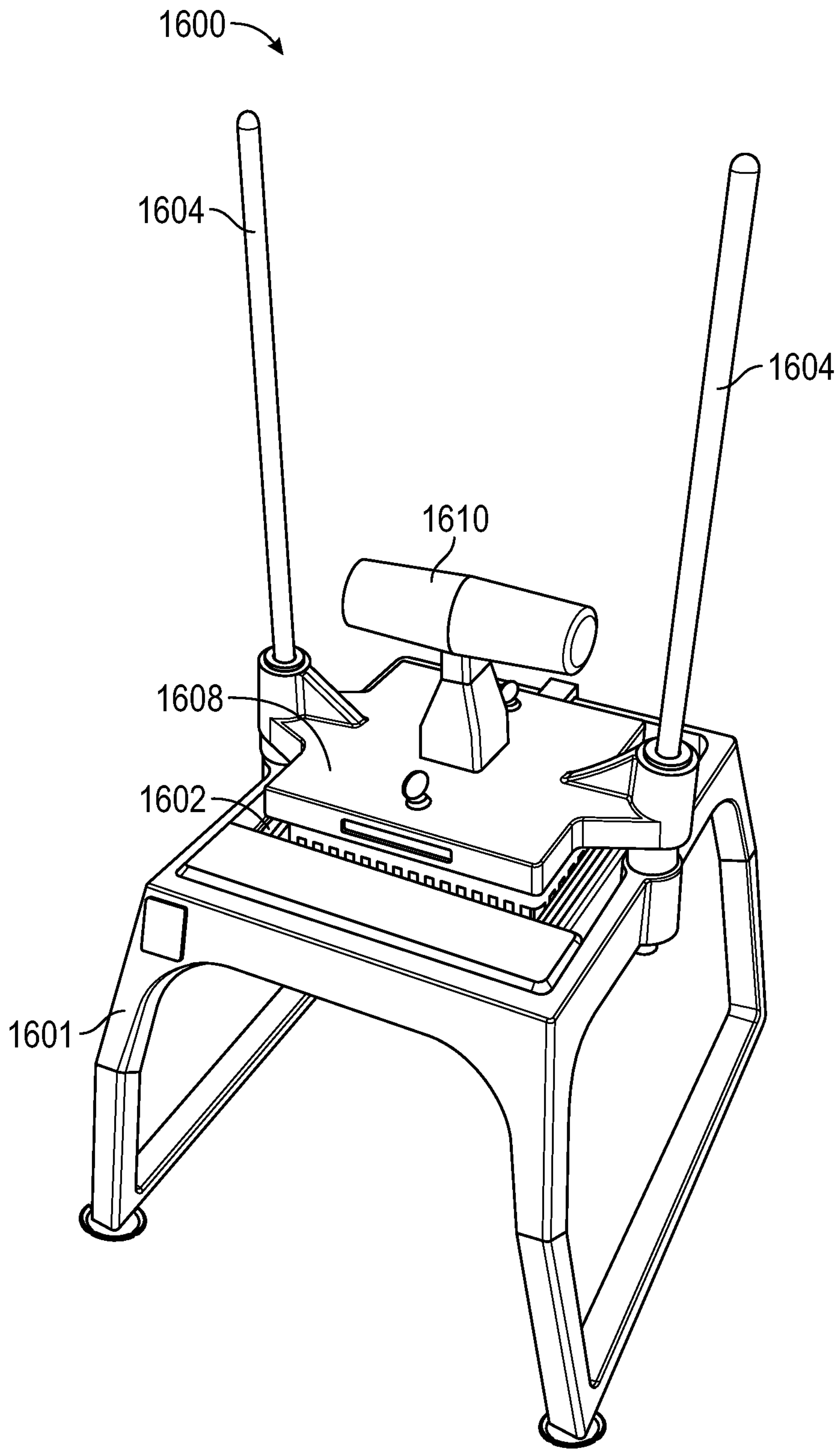
FIG. 16 is a view of a manual food processor, according to some embodiments.

Referring now to FIG. 16, a manual food processor 1600 is shown, according to an exemplary embodiment. The manual food processor 1600 provides a simplified design relative to the manual food processor 100 described above. The manual food processor 1600 includes a frame 1601 that supports a blade set (blade pack) 1602 and a pair of guide rails 1604. The manual food processor 1600 also includes a T-handle assembly 1608 configured to slide along the guide rails 1604. The guide rails 1604 extend normal to a plane defined by the blade set 1602.

In the example of FIG. 16, the T-handle assembly 1608 includes a grip 1610 fixedly coupled thereto. The grip 1610 is configured to be held by a user and moved upwards or downwards to slide the T-handle assembly 1608 along the guide rails. The T-handle assembly 1608 includes a plurality of protrusions that align with gaps in the blade set 1602 and are configured to push foodstuffs through the blade set 1602. Accordingly, the user can move the grip 1610 upwards to provide space for foodstuff to be placed on the blade set 1602, then move the grip 1610 downwards to push the foodstuff through the blade set 1602. The blade set 1602 is offset from a surface (table, counter, etc.) by the frame 1601, such that a container can be placed under the blade set 1602 to receive the cut foodstuff.

Figure 17:
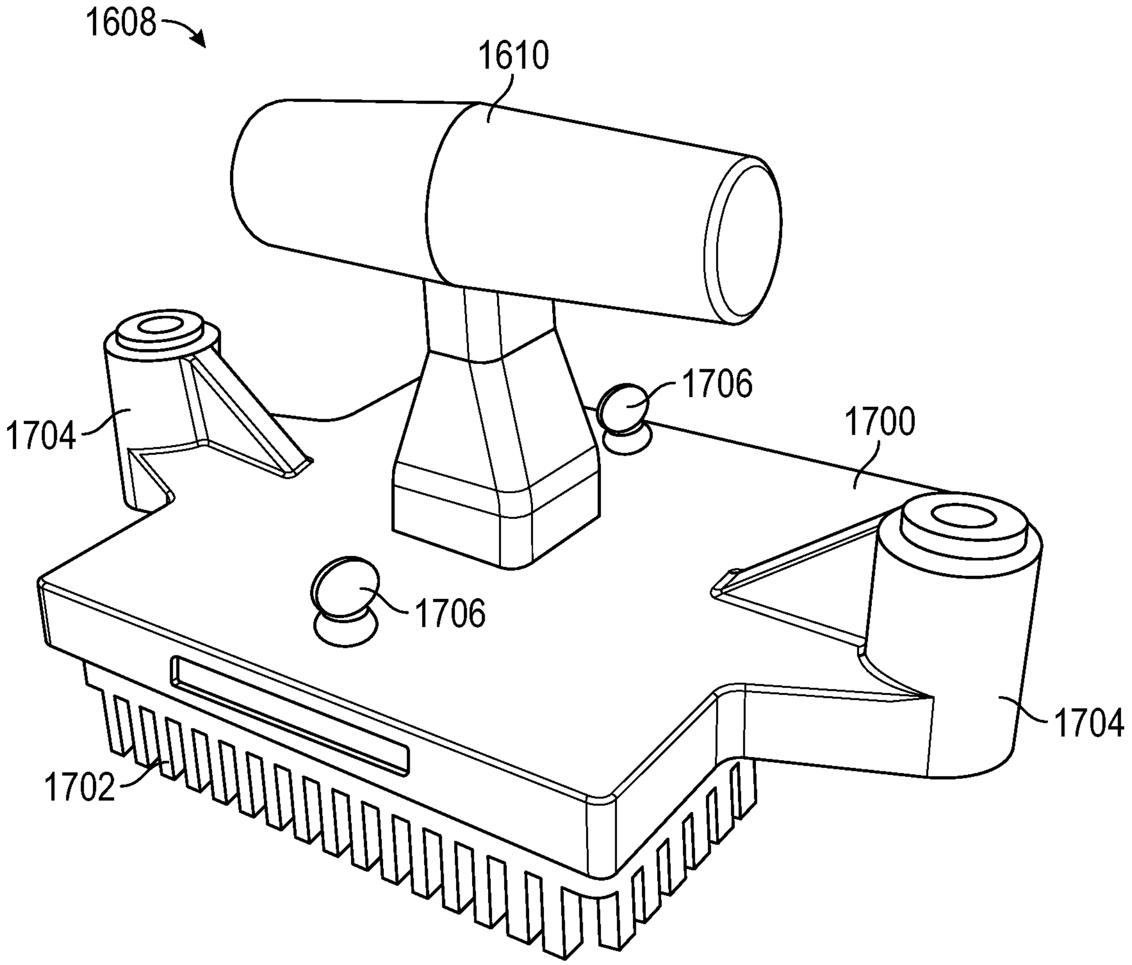
FIG. 17 is a view of a T-handle assembly of the manual food processor of FIG. 16, according to some embodiments.
Figure 18:
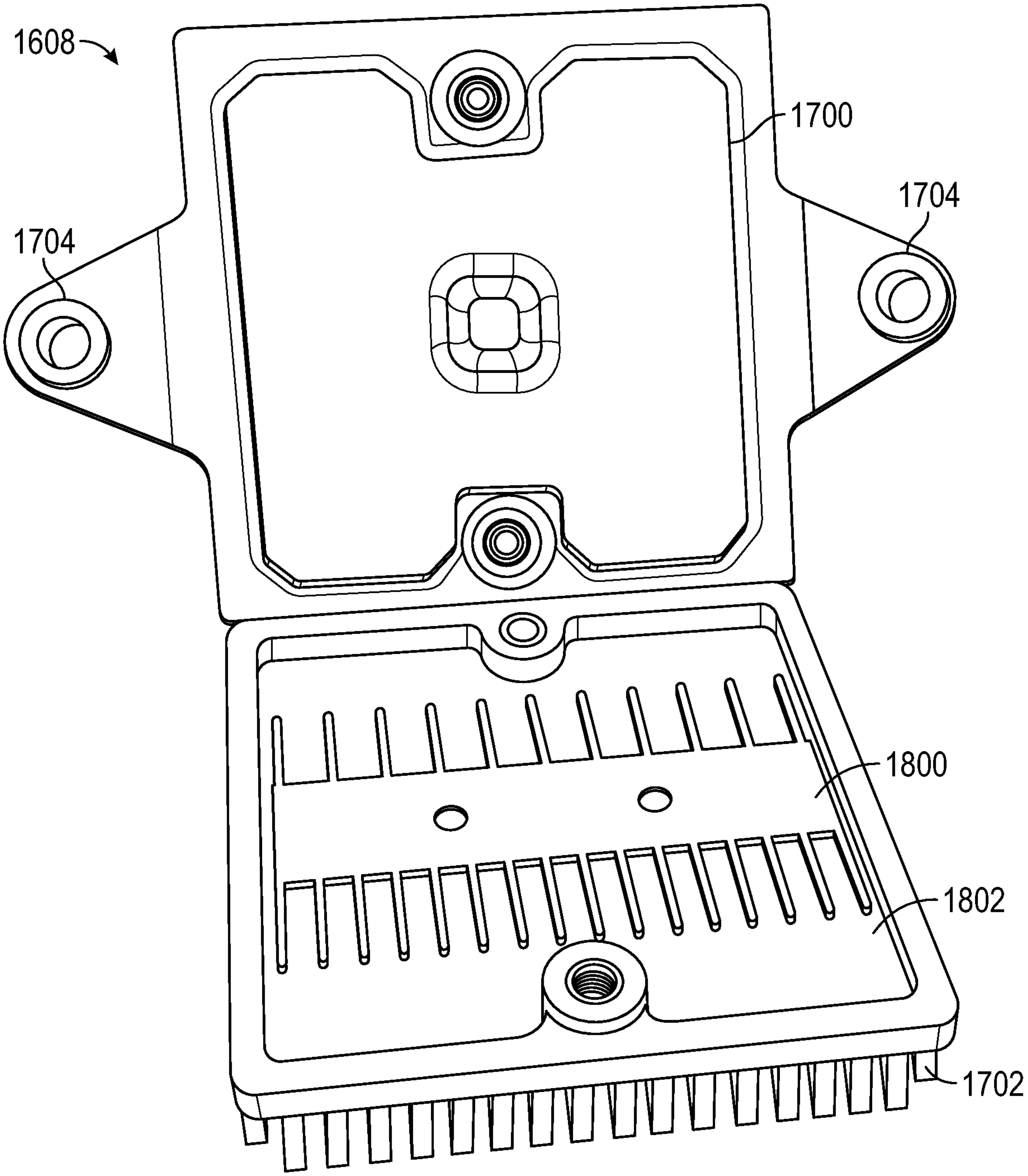
FIG. 18 is a view of the T-handle assembly of FIG. 17 opened to allow access to a cleaning tool, according to some embodiments.

FIGS. 17-18 show the T-handle assembly 1608 in more detail. As shown in FIG. 17, the T-handle assembly 1608 includes a body 1700, with the grip 1610 extending vertically from the body 1700. In the embodiment shown, the grip 1610 is T-shaped, while other ergonomic designs are used in other embodiments. The T-handle assembly 1608 also includes a pair of sleeves 1704 positioned on opposing edges of the body 1700. The sleeves 1704 are configured to receive the guide rails 1604 and allow the T-handle assembly 1608 to slide along the guide rails 1604.

The body 1700 is coupled to a pusher block 1702. The pusher block 1702 is formed with a plurality of protrusions that correspond to spaces between blades in the blade set 1602. That is, the pusher block 1702 provides the structure that allows the T-handle assembly 1608 to interface with the blade set 1602.

The pusher block 1702 is removeably coupled to the body 1700 by a pair of fasteners 1706. The example of FIGS. 17-18 includes two fasteners 1706, while other numbers of fasteners are used in various embodiments. The fasteners 1706 can be loosened to disconnect the pusher block 1702 from the body 1700, for example as shown in FIG. 18. In other embodiments, various fasteners may be used (e.g., screws, couplings, latches, clips, snaps, nuts, bolts, etc.).

As shown in FIG. 18, a cleaning tool 1800 may be housed between the pusher block 1702 and the body 1700. The pusher block 1702 may include a recess 1802 configured to receive the cleaning tool 1800, with the recess then covered by the body 1700 when the body 1700 is coupled to the pusher block 1702 (e.g., with the fasteners 1706). The cleaning tool 1800 can thereby be removeably retained by the pusher block 1702 and stored within the T-handle assembly 1608. This may help a user avoid losing the cleaning tool 1800 and make the cleaning tool 1800 easily accessible when a user desires to use the cleaning tool 1800 to clean the pusher block 1702.

Figure 19:
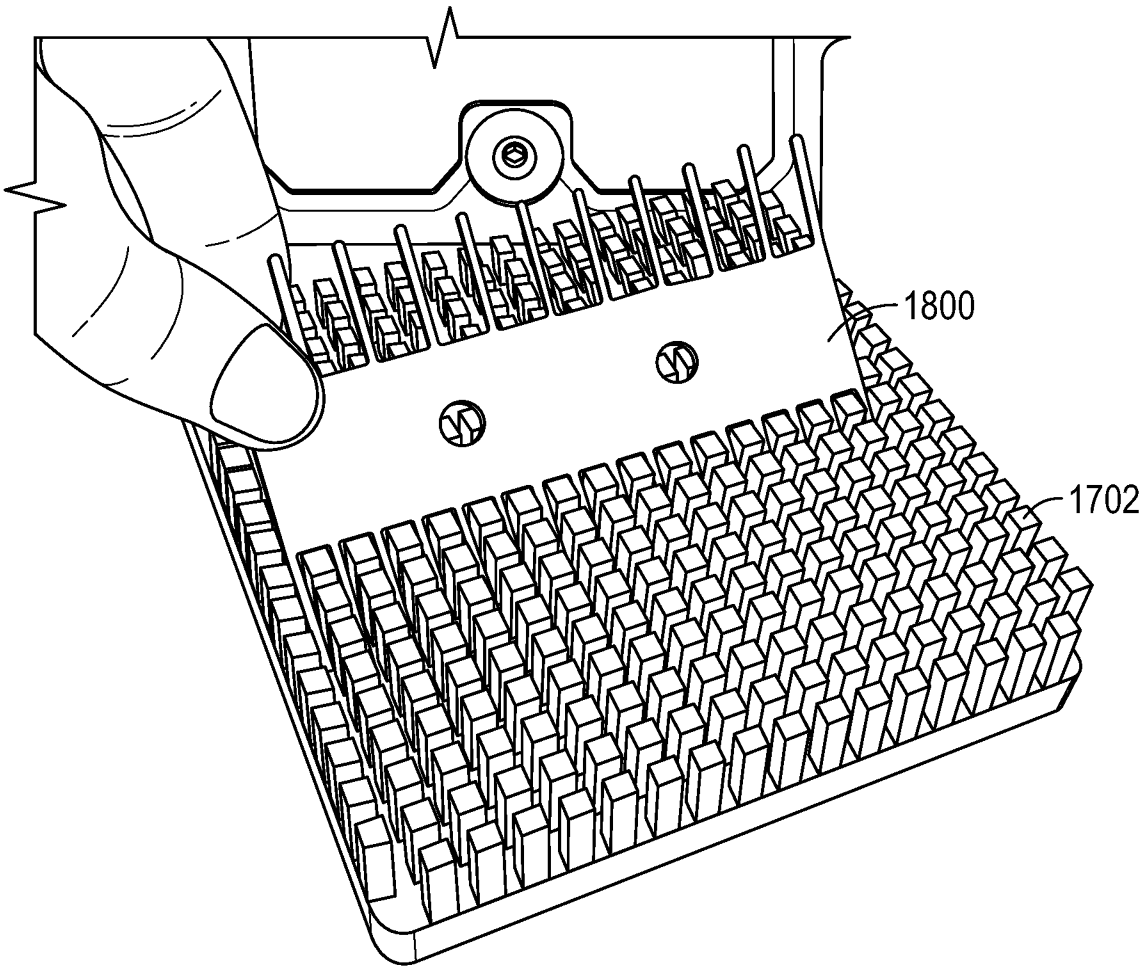
FIG. 19 is an illustration of the cleaning tool used to clean the pusher block, according to some embodiments.

FIG. 19 illustrates the cleaning tool 1800 in use to clean the pusher block 1702. The cleaning tool 1800 shown is configured in a comb-like design for combing debris out of the pusher block 1702. The cleaning tool 1800 includes multiple teeth, with the teeth spaced apart in accordance with a spacing of the protrusions of the pusher block 1702. That is, the teeth are positioned and proportioned to simultaneously fit in the gaps between protrusions of the pusher block 1702, thereby allowing a user to use the cleaning tool 1800 to clean between the protrusions. The cleaning tool 600 shown in FIG. 6 may be similarly configured, dimensioned to match the pusher block cartridge 114. The dimensions of the cleaning tool may be adapted to match changes in the geometry and dimensions of the pusher block. In other embodiments, other types of cleaning tools may be included (e.g., scrub brushes, wire brushes, etc.).

As an exemplary use case, fragments of foodstuff may become lodged, jammed, stuck, etc. in the gaps of the pusher block 1702. The cleaning tool 1800 (or cleaning tool 600) is configured to provide a purpose-made tool for removing such foodstuff from the protrusion plate. Furthermore, because the cleaning tool 1800 can be stored in an accessible location within the T-handle assembly 1608 (and because the cleaning tool 600 can be stored at an accessible location within the manual food processor 100), the cleaning tool 1800 (or the cleaning tool 600) is readily available precisely where and when needed by a user. This results in a high level of ease, convenience, efficiency, and effectiveness for cleaning of the manual food processors 100, 1600.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

Other arrangements and combinations of the elements described herein and shown in the Figures are also contemplated by the present disclosure. The construction and arrangement of the systems and apparatuses as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. Other substitutions, modifications, changes, and omissions can be made in the design, operating conditions and arrangement of the exemplary embodiments without departing from the scope of the present disclosure.

What is claimed is:

1. A manual food processor, comprising:

a blade cartridge comprising a plurality of spaced apart blades;

a pusher block cartridge comprising a plurality of projections arranged in a grid and extending from a bottom side of the pusher block cartridge, the plurality of projections defining spaces between the plurality of projections;

a first shelf configured to receive the blade cartridge;

a first guide rail and a second guide rail extending from the first shelf;

a second shelf slidable along the first and second guide rails between an open position and a closed position and configured to removeably receive the pusher block cartridge, wherein the plurality of blades are at least partially received in the spaces between the plurality of projections when the second shelf is in the closed position; and a cleaning tool for the manual food processor comprising a plurality of teeth spaced apart to match the spaces between the plurality of projections such that the plurality of teeth are simultaneously insertable into and movable through the spaces between the plurality of projections;

wherein the pusher block cartridge further comprises a recess on a top side of the pusher block cartridge configured to receive the cleaning tool.

2. The manual food processor of claim 1, wherein the cleaning tool is inaccessibly retained on the pusher block cartridge while the pusher block cartridge is received by the second shelf and is accessible for removal from the pusher block cartridge when the pusher block cartridge is removed from the second shelf.

3. The manual food processor of claim 1, further comprising a handle mechanism operable to cause the second shelf to slide along the first and second guide rails between the open position and the closed position, wherein the first shelf is spaced apart from the second shelf in the open position and wherein the pusher block cartridge interfaces with the blade cartridge in the closed position.

4. The manual food processor of claim 3, wherein the handle mechanism is configured to provide a mechanical advantage such that a force exerted by the pusher block cartridge is greater than a force exerted on the handle mechanism by a user.

5. The manual food processor of claim 1, wherein the pusher block cartridge is removable from and insertable into the second shelf in a direction perpendicular to a direction of the guide rails.

6. The manual food processor of claim 1, the second shelf comprising a slider configured to selectively retain the pusher block cartridge at the second shelf.

7. The manual food processor claim 1, wherein the cleaning tool is accessible when the pusher block cartridge is removed from the second shelf and inaccessible when the pusher block cartridge is received by the second shelf.

8. A manual food processor, comprising:

a blade cartridge and a pusher block cartridge;

a first shelf configured to receive the blade cartridge;

guide rails extending from the first shelf;

a second shelf slidable along the guide rails and configured to receive the pusher block cartridge; and a handle mechanism operable to cause the second shelf to slide along the guide rails between an open position and a closed position, wherein the first shelf is spaced apart from the second shelf in the open position and wherein the pusher block cartridge interfaces with the blade cartridge in the closed position, the handle mechanism comprising:

a plurality of first pivot points positioned at the second shelf;

a plurality of second pivot points positioned at top ends of the guide rails;

first members extending from the first pivot points; and second members extending from the second pivot points, wherein third pivot points connect the first members with the second members;

a pin coupled to a first guide rail of the guide rails and configured to selectively obstruct a path of movement of one of the first members, wherein the pin restricts downward movement of the second shelf when the pin obstructs the path of movement;

wherein the pin is configured to be displaced from the path of movement by the one of the first members during upward movement of the second shelf.

9. The manual food processor of claim 8, wherein the pin is configured to be manipulated by a user to remove the pin from the path of movement.

* * * * *